(12) United States Patent
Zhou et al.

(10) Patent No.: US 12,124,851 B2
(45) Date of Patent: Oct. 22, 2024

(54) GRAPH INSTRUCTION PROCESSING METHOD AND APPARATUS

(71) Applicant: HUAWEI TECHNOLOGIES CO., LTD., Guangdong (CN)

(72) Inventors: Ruoyu Zhou, Shenzhen (CN); Fan Zhu, Shenzhen (CN); Wenbo Sun, Hangzhou (CN); Xiping Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 18/067,538

(22) Filed: Dec. 16, 2022

(65) Prior Publication Data
US 2023/0120860 A1    Apr. 20, 2023

Related U.S. Application Data

(63) Continuation of application No. PCT/CN2020/096899, filed on Jun. 18, 2020.

(51) Int. Cl.
G06F 9/30    (2018.01)

(52) U.S. Cl.
CPC ................. G06F 9/30058 (2013.01)

(58) Field of Classification Search
None
See application file for complete search history.

(56) References Cited

U.S. PATENT DOCUMENTS

| | | | | |
|---|---|---|---|---|
| 6,305,014 | B1* | 10/2001 | Roediger | G06F 8/445 717/154 |
| 6,557,095 | B1* | 4/2003 | Henstrom | G06F 9/384 712/216 |
| 10,102,158 | B1* | 10/2018 | Nally | G06F 13/1668 |
| 10,909,135 | B1* | 2/2021 | Stotts | G06F 16/24575 |
| 2005/0223384 | A1* | 10/2005 | Klingman | G06F 9/4881 718/107 |

(Continued)

FOREIGN PATENT DOCUMENTS

CN    108415776 A    8/2018

OTHER PUBLICATIONS

Extended European Search Report in European ApplN No. 20940543.0, dated Jun. 1, 2023, 9 pages.

(Continued)

*Primary Examiner* — Eric Coleman
(74) *Attorney, Agent, or Firm* — Fish & Richardson P.C.

(57) ABSTRACT

Disclosed are a graph instruction processing method and apparatus, which relates to the field of computer technologies One example method includes: detecting whether a first graph instruction has a conditional instruction element; and when the first graph instruction has the conditional instruction element, determining that the first graph instruction is a conditional execution instruction, and processing the first graph instruction when both data flow information and control flow information of the first graph instruction are in a ready state; or when the first graph instruction does not have a conditional instruction element, determining that the first graph instruction is a non-conditional execution instruction, and processing the first graph instruction when data flow information of the first graph instruction is in a ready state.

20 Claims, 13 Drawing Sheets

(56) References Cited

U.S. PATENT DOCUMENTS

| | | | | |
|---|---|---|---|---|
| 2010/0161938 | A1* | 6/2010 | Heddes | G06F 15/16 |
| | | | | 712/E9.002 |
| 2012/0096242 | A1* | 4/2012 | Hussain | G06F 9/3013 |
| | | | | 712/E9.028 |
| 2015/0378868 | A1* | 12/2015 | Levit-Gurevich | ........... |
| | | | | G06F 11/3692 |
| | | | | 714/38.1 |
| 2016/0378496 | A1* | 12/2016 | Gray | G06F 9/3824 |
| | | | | 712/206 |
| 2017/0083335 | A1 | 3/2017 | Burger et al. | |
| 2018/0341488 | A1* | 11/2018 | Burger | G06F 9/3842 |
| 2019/0056941 | A1* | 2/2019 | Wang | G06F 9/30079 |

OTHER PUBLICATIONS

International Search Report and Written Opinion in International Appln. No. PCT/CN2020/096899, mailed on Mar. 17, 2021, 16 pages (with English translation).

* cited by examiner

GRAPH INSTRUCTION PROCESSING METHOD AND APPARATUS

CROSS-REFERENCE TO RELATED APPLICATIONS

This application is a continuation of International Application No. PCT/CN2020/096899, filed on Jun. 18, 2020, the disclosure of which is hereby incorporated by reference in its entirety.

TECHNICAL FIELD

This application relates to the field of computer technologies, and in particular, to a graph instruction processing method and apparatus.

BACKGROUND

A directed graph flow computing architecture (graph flow architecture) transforms a data flow and a control flow into a directed graph including N nodes. A connection line between nodes represents one data flow (data flow) or one control flow (control flow). In the directed graph flow computing architecture, a degree of parallelism of the data flow is triggered by detecting whether an input of each node in the directed graph flow computing architecture is ready (ready).

In the directed graph flow computing architecture, for a graph instruction with a condition input (for example, a branch operation such as if-else), a dependency relationship of the control flow needs to be converted into a dependency relationship of the data flow. In a conventional technology, a switch (switch) instruction and a gate (gate) instruction are usually used to convert the dependency relationship of the control flow into the dependency relationship of the data flow. For example, as shown in (a) in FIG. 1, for an instruction for which a condition input p needs to be determined as true (true, T), a gate instruction whose result is T may be set at a condition input end of the instruction, so that after the condition input of the instruction is T and both a left input and a right input are ready (ready), an operation may be performed by using an arithmetic logic unit (arithmetic logic unit, ALU). As shown in (b) in FIG. 1, for an instruction for which a condition input p needs to be determined as false (false, F), a gate instruction whose result is F may be set at a condition input end of the instruction, so that after the condition input of the instruction is F and both a left input and a right input are ready (ready), an operation may be performed by using an ALU.

However, when the switch instruction and the gate instruction are used to convert the dependency relationship of the control flow into the dependency relationship of the data flow, the switch instruction or the gate instruction may occupy a clock cycle of computing resources and a specific bus resource. Further, when the directed graph flow computing architecture includes a large quantity of switch instructions and gate instructions, a large quantity of instruction space resources in a processor are consumed. In addition, use of the switch instruction and the gate instruction also limits a degree of parallelism between instructions, thereby affecting running performance of the processor.

SUMMARY

This application provides a graph instruction processing method and apparatus, to reduce requirements for a bus resource and an instruction space resource in a graph instruction processing process.

To achieve the foregoing objectives, the following technical solutions are used in embodiments of this application.

According to a first aspect, a graph instruction processing method is provided. The method includes: detecting whether a first graph instruction has a conditional instruction element; and when the first graph instruction has the conditional instruction element, determining that the first graph instruction is a conditional execution instruction, and processing the first graph instruction when both data flow information and control flow information of the first graph instruction are in a ready state, and the data flow information herein may include a left input and a right input, and the control flow information herein may include a condition input; or when the first graph instruction does not have a conditional instruction element, determining that the first graph instruction is a non-conditional execution instruction, and processing the first graph instruction when data flow information of the first graph instruction is in a ready state, and the data flow information herein may include a left input and a right input.

In the foregoing technical solution, whether the first graph instruction has the conditional instruction element is detected. If the first graph instruction has the conditional instruction element, it is determined that the first graph instruction is the conditional execution instruction. If the first graph instruction does not have the conditional instruction element, it is determined that the first graph instruction is the non-conditional execution instruction. Subsequently, the first graph instruction may be correspondingly processed depending on whether the first graph instruction is the conditional execution instruction or the non-conditional execution instruction, thereby reducing requirements for a bus resource and an instruction space resource in a graph instruction processing process. In this technical solution, a dependency relationship of a control flow does not need to be converted into a dependency relationship of a data flow, and a large quantity of switch instructions and gate instructions are not required, thereby ensuring running performance of a processor.

In a possible implementation of the first aspect, the conditional instruction element is 1 bit, for example, when a value of the 1 bit is 1, it indicates that the first graph instruction has the conditional instruction element; or when a value of the 1 bit is 0, it indicates that the first graph instruction does not have the conditional instruction element; and/or the control flow information is 1 bit, for example, the control flow information is a 1-bit conditional signal. In the foregoing possible implementation, when the conditional instruction element is 1 bit or the control flow information is 1 bit, a requirement of the conditional instruction element or the control flow information for the bus resource may be reduced as much as possible.

In a possible implementation of the first aspect, the conditional instruction element and the control flow information are transmitted through a control bus, and the data flow information is transmitted through a data bus. In the foregoing possible implementation, interference caused by the conditional instruction element and the control flow information to the data flow information can be reduced.

In a possible implementation of the first aspect, the method further includes: receiving first broadcast information, where the first broadcast information indicates a first broadcast channel; and when a broadcast channel for which the first graph instruction is registered is the first broadcast channel, determining that the control flow information of the first graph instruction is in the ready state. Optionally, at least one graph instruction is registered for the first broadcast channel, the at least one graph instruction is related to a first processing result of a second graph instruction, the at least one graph instruction herein includes the first graph instruction, and the method further includes: when a processing result of the second graph instruction is the first processing result, sending the first broadcast information. In the foregoing possible implementation, when there are a large quantity of output addresses of the second graph instruction, processing results of the second graph instruction may be simultaneously transmitted, in a broadcast manner, to graph instructions corresponding to the plurality of output addresses, thereby improving a graph instruction processing speed.

In a possible implementation of the first aspect, the method further includes: when the processing result of the second graph instruction is a second processing result, sending second broadcast information, where the second broadcast information indicates a second broadcast channel, and a broadcast channel for which at least one graph instruction related to the second processing result is registered is the second broadcast channel. In the foregoing possible implementation, when there are a large quantity of output addresses of the second graph instruction, processing results of the second graph instruction may be simultaneously transmitted, in a broadcast manner, to graph instructions corresponding to the plurality of output addresses, thereby improving a graph instruction processing speed.

In a possible implementation of the first aspect, the method further includes: registering the first graph instruction for the first broadcast channel in a process of compiling the first graph instruction. In the foregoing possible implementation, a plurality of graph instructions that are registered for a same broadcast channel can simultaneously obtain corresponding control flow information, thereby improving a graph instruction processing speed.

In a possible implementation of the first aspect, when the control flow information of the first graph instruction includes a logical operation, the logical operation is used to generate at least one conditional signal. Optionally, if the control flow information of the first graph instruction includes an OR operation, a left input and a right input corresponding to the OR operation each may be used to generate one conditional signal, and it can be determined that the condition input of the first graph instruction is ready when at least one of the two generated conditional signals arrives. Alternatively, if the control flow information of the first graph instruction includes an AND operation, a left input and a right input corresponding to the AND operation each may be used to generate one conditional signal, and it can be determined that the condition input of the first graph instruction is ready when both the generated two conditional signals arrive. In the foregoing possible implementation, the control flow information includes the logical operation that is only used to generate a conditional signal with a small data bit width, and does not need to occupy a large data bit width as the data flow information of the graph instruction, thereby reducing a requirement for the bus resource in a graph instruction processing process.

In a possible implementation of the first aspect, when the first graph instruction is a read instruction or a write instruction, the method further includes: determining, according to a preset read/write sequence, a graph instruction for issuing the control flow information of the first graph instruction. For example, the preset read/write sequence may be a read/write sequence in an original program corresponding to the first graph instruction. In the foregoing possible implementation, the graph instruction for issuing the control flow information of the first graph instruction is determined according to the preset read/write sequence, and a read instruction and a write instruction that may have a dependency relationship may be associated by using a conditional signal, to implement the read/write sequence of a memory in the original program.

According to a second aspect, a graph instruction processing apparatus is provided. The apparatus includes: a status buffer unit, an arbitration unit, and an operation unit. The status buffer unit is configured to detect whether a first graph instruction has a conditional instruction element; and the status buffer unit and the arbitration unit are further configured to: when the first graph instruction has the conditional instruction element, determine that the first graph instruction is a conditional execution instruction, and the operation unit is configured to process the first graph instruction when both data flow information and control flow information of the first graph instruction are in a ready state; or the status buffer unit and the arbitration unit are further configured to: when the first graph instruction does not have a conditional instruction element, determine that the first graph instruction is a non-conditional execution instruction, and the operation unit is further configured to process the first graph instruction when data flow information of the first graph instruction are in a ready state.

In a possible implementation of the second aspect, the conditional instruction element is 1 bit, for example, when a value of the 1 bit is 1, it indicates that the first graph instruction has the conditional instruction element; or when a value of the 1 bit is 0, it indicates that the first graph instruction does not have the conditional instruction element; and/or the control flow information is 1 bit, for example, the control flow information is a 1-bit conditional signal.

In a possible implementation of the second aspect, the apparatus further includes a control bus and a data bus, the conditional instruction element and the control flow information are transmitted through the control bus, and the data flow information is transmitted through the data bus.

In a possible implementation of the second aspect, the apparatus further includes a listening register. The listening register is configured to receive first broadcast information, where the first broadcast information indicates a first broadcast channel; and the status buffer unit is further configured to: when a broadcast channel for which the first graph instruction is registered is the first broadcast channel, mark that the control flow information of the first graph instruction as the ready state.

In a possible implementation of the second aspect, at least one graph instruction is registered for the first broadcast channel, the at least one graph instruction is related to a first processing result of a second graph instruction, the at least one graph instruction herein includes the first graph instruction, and the apparatus further includes: an output unit, configured to: when a processing result of the second graph instruction is the first processing result, send the first broadcast information.

In a possible implementation of the second aspect, the output unit is further configured to: when the processing result of the second graph instruction is a second processing result, send second broadcast information, where the second broadcast information indicates a second broadcast channel, and a broadcast channel for which at least one graph instruction related to the second processing result is registered is the second broadcast channel.

In a possible implementation of the second aspect, the apparatus further includes a compiler, configured to register the first graph instruction for the first broadcast channel in a process of compiling the first graph instruction.

In a possible implementation of the second aspect, when the control flow information of the first graph instruction includes a logical operation, the logical operation is used to generate at least one conditional signal. Optionally, if the control flow information of the first graph instruction includes an OR operation, a left input and a right input corresponding to the OR operation each may be used to generate one conditional signal, and it can be determined that the condition input of the first graph instruction is ready when at least one of the two generated conditional signals arrives. Alternatively, if the control flow information of the first graph instruction includes an AND operation, a left input and a right input corresponding to the AND operation each may be used to generate one conditional signal, and it can be determined that the condition input of the first graph instruction is ready when both the generated two conditional signals arrive.

In a possible implementation of the second aspect, when the first graph instruction is a read instruction or a write instruction, the apparatus further includes a compiler, configured to determine, according to a preset read/write sequence, a graph instruction for issuing the control flow information of the first graph instruction. For example, the preset read/write sequence may be a read/write sequence in an original program corresponding to the first graph instruction.

According to another aspect of this application, a graph instruction processing device is provided. The graph instruction processing device includes a processor and a memory. The memory stores instructions. When the processor runs the instructions, the instruction processing device is enabled to perform the graph instruction processing method provided in any one of the first aspect or the possible implementations of the first aspect.

According to another aspect of this application, a readable storage medium is provided. The readable storage medium stores instructions. When the readable storage medium runs on a device, the device is enabled to perform the graph instruction processing method provided in any one of the first aspect or the possible implementations of the first aspect.

According to another aspect of this application, a computer program product is provided. When the computer program product is run on a computer, the computer is enabled to perform the graph instruction processing method provided in any one of the first aspect or the possible implementations of the first aspect.

It may be understood that the apparatus, the electronic device, the computer storage medium, or the computer program product of any one of the foregoing graph instruction processing methods are used to perform corresponding method described above. Therefore, for a beneficial effect that can be achieved by the apparatus, the electronic device, the computer storage medium, or the computer program product, refer to the beneficial effect in the corresponding method described above, and details are not described herein again.

DESCRIPTION OF EMBODIMENTS

Figure 1:
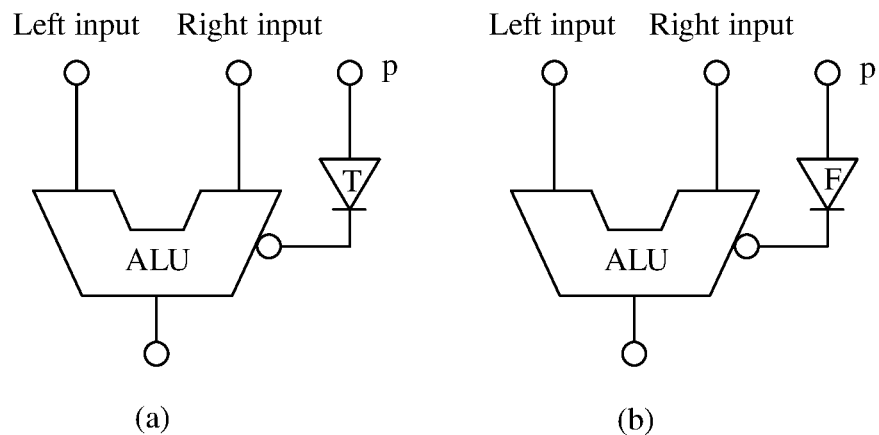
FIG. 1(a) and FIG. 1(b) are a schematic operation diagram of a graph instruction with a condition input.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally indicates an "or" relationship between the associated objects. "At least one item (piece) of the following" or a similar expression thereof means any combination of the items, including any combination of singular items (pieces) or plural items (pieces). For example, at least one (piece) of a, b, or c may indicate a, b, c, a and b, a and c, b and c, or a, b, and c, where a, b, and c may be singular or plural. In addition, in embodiments of this application, words such as "first" and "second" do not limit a quantity and an execution order.

It should be noted that in this application, the term such as "an example" or "for example" is used to represent giving an example, an illustration, or descriptions. Any embodiment or design scheme described as "an example" or "for example" in this application should not be explained as being more preferred or having more advantages than another embodiment or design scheme. Exactly, use of the word "an example" or "for example" or the like is intended to present a relative concept in a specific manner.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

To facilitate understanding of the technical solutions in embodiments of this application, a directed graph flow computing architecture (graph flow architecture) in embodiments of this application is first described.

The directed graph flow computing architecture converts a data flow and a control flow into a directed graph including N nodes. A connection line between nodes represents a data flow (data flow) or a control flow (control flow), and each node is used as a graph instruction. For the graph instruction in the directed graph flow computing architecture, once an input required by the graph instruction is ready, the graph instruction may be used for operation and a result is sent to a corresponding input of a lower-level graph instruction. An input required by one graph instruction may include a left input (l) and a right input (r), and the left input (l) and the right input (r) herein each may be referred to as a data flow. Further, the input required by the one graph instruction may further include a condition input (p), and the condition input herein may be referred to as a control flow. In the directed graph flow computing architecture, for one graph instruction, only an output address needs to be provided, and input information of the instruction does not need to be provided. For each graph instruction, it only needs to be ensured that an operation result of one or more graph instructions is transferred to an input of the graph instruction. Therefore, the directed graph flow computing architecture has an advantage of simple coding.

Figure 2:
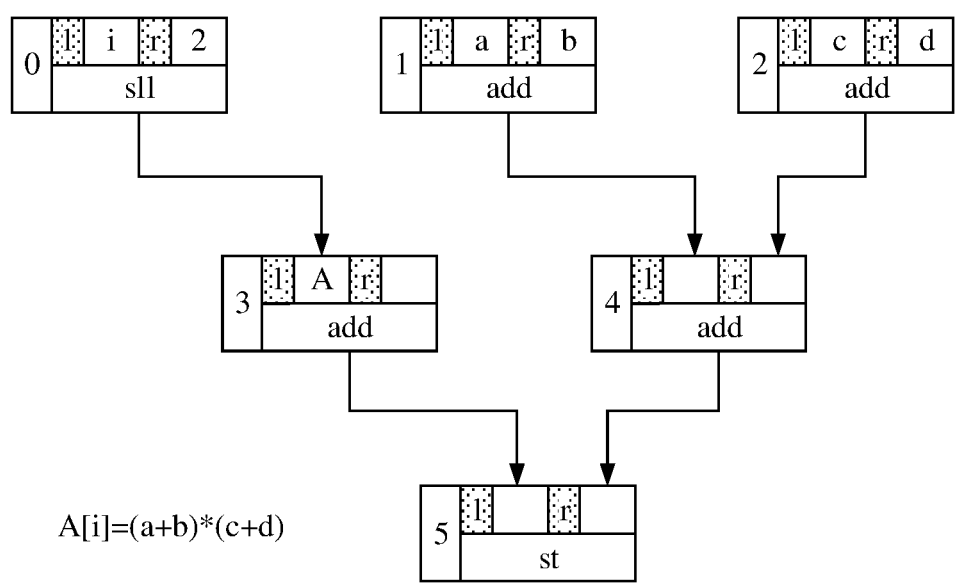
FIG. 2 is a schematic diagram of a directed graph flow computing architecture according to an embodiment of this application.

For example, the directed graph flow computing architecture shown in FIG. 2 includes six graph instructions, and corresponding IDs are respectively represented as 0 to 5. The graph instruction 0 is connected to a right input (r) of the next-level graph instruction 3, the graph instruction 1 and the graph instruction 2 are respectively connected to a left input (l) and a right input (r) of the next-level graph instruction 4, and the graph instruction 3 and the graph instruction 4 are respectively connected to a left input (l) and a right input (r) of the next-level graph instruction 5. An add operation a+b in the graph instruction 1 is used as an example. In a graph architecture instruction set, the graph instruction 1 may be represented as "1 add 4l", which means that once a and b of the graph instruction 1 are ready, an operation result of a+b of the graph instruction 1 is transmitted to the left input (l) of the graph instruction 4. sll, add, mul, and st in FIG. 2 respectively represent different operators. i, a, c, and A in left inputs (l), and 2, b, and d in right inputs (l) respectively represent operands of different inputs.

In the directed graph flow computing architecture, a plurality of graph instructions that do not have a dependency relationship may be concurrently executed, to improve a computing speed. For example, for the directed graph flow computing architecture shown in FIG. 2, the graph instruction 0, the graph instruction 1, and the graph instruction 2 may be executed in a first clock cycle, the graph instruction 3 and the graph instruction 4 may be executed in a second clock cycle, and the graph instruction 5 may be executed in a third clock cycle.

In the directed graph flow computing architecture, for a graph instruction with a condition input (for example, a branch operation such as if-else), a dependency relationship of the control flow needs to be converted into a dependency relationship of the data flow. Generally, a switch (switch) instruction and a gate (gate) instruction may be usually used to convert the dependency relationship of the control flow into the dependency relationship of the data flow. However, when the switch instruction and the gate instruction are used to convert the dependency relationship of the control flow into the dependency relationship of the data flow, the switch instruction or the gate instruction may occupy a clock cycle of computing resources and a specific bus resource. Further, when an instruction set corresponding to the directed graph flow computing architecture includes a large quantity of switch instructions and gate instructions, a large quantity of space resources in a processor are consumed. In addition, use of the switch instruction and the gate instruction also limits a degree of parallelism between instructions, thereby affecting running performance of the processor.

Based on this, embodiments of this application provide a graph instruction processing method and apparatus, to resolve a series of problems caused by converting the dependency relationship of the control flow into the dependency relationship of the data flow in the directed graph flow computing architecture. The technical solutions provided in embodiments of this application may be applied to an electronic device including a processor. For example, the electronic device may be various devices such as a computer, a mobile phone, a tablet, a personal digital assistant, an intelligent wearable device, a smart vehicle-mounted device, and a smart home appliance. A specific description of an architecture of the processor in the electronic device may be as follows.

Figure 3:
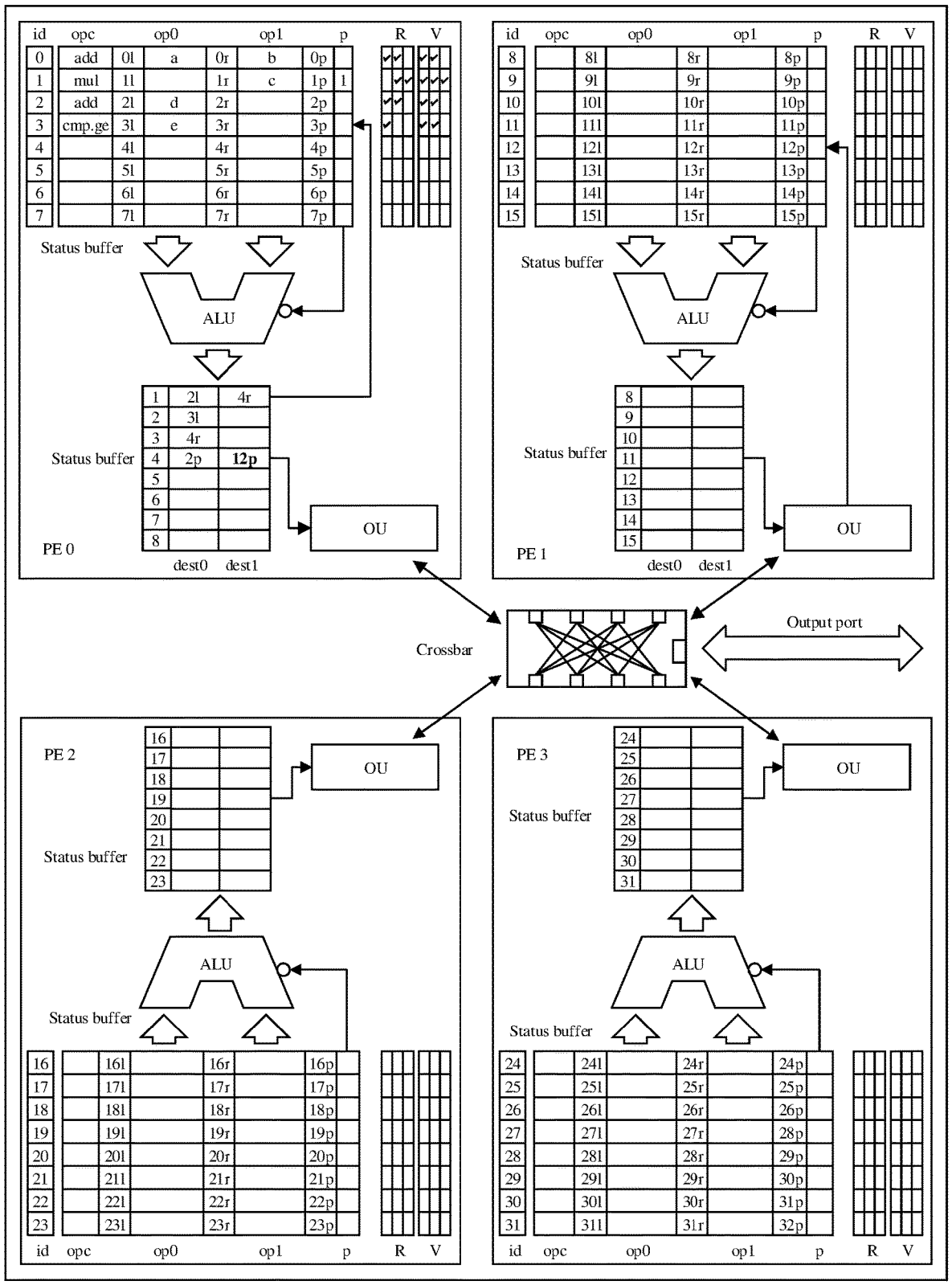
FIG. 3 is a schematic diagram of a structure of a processor according to an embodiment of this application.
Figure 4:
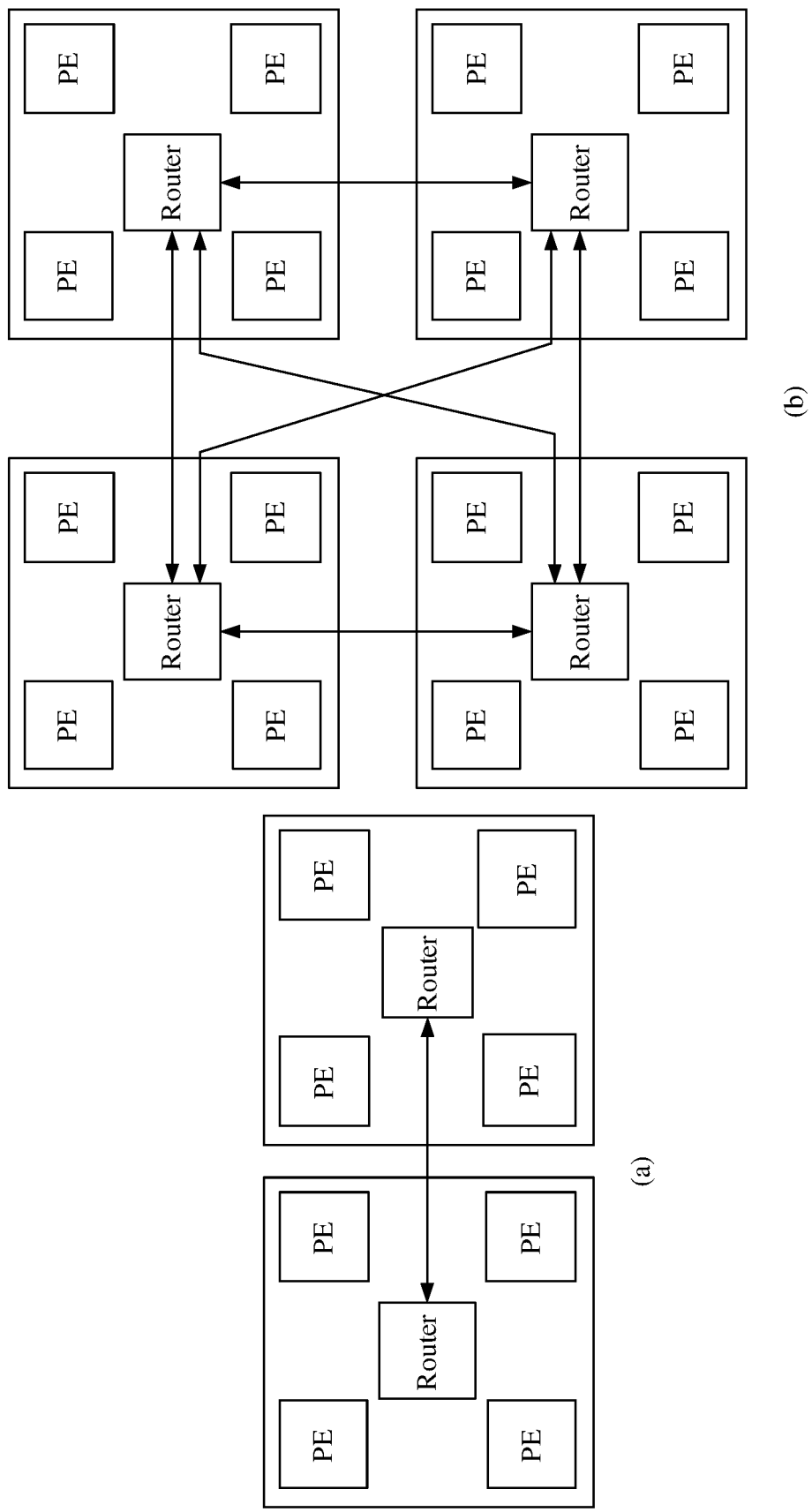
FIG. 4(a) and FIG. 4(b) are a schematic diagram of another structure of a processor according to an embodiment of this application.

FIG. 3 and FIG. 4 are schematic diagrams of architectures of a processor according to an embodiment of this application. The architecture of the processor may be configured to perform the foregoing directed graph flow computing architecture. The architecture of the processor may include one or more processing engines (process engine, PE). Each PE may include a status buffer, an arbitration logic unit, one or more arithmetic logic units (arithmetic logic unit, ALU), a write-back unit, and the like. Optionally, each PE may further include an output unit (output unit, OU). The status buffer may be configured to cache a graph instruction in the directed graph flow computing architecture, a ready field segment and a valid field segment that are related to the graph instruction, an output address (destination, dest) of the graph instruction, and the like. The valid field segment herein indicates whether the graph instruction requires an input parameter, and the ready field segment indicates whether each input parameter of the graph instruction is ready. The arbitration logic unit may be configured to select one graph instruction by using input ready information of each graph instruction, and issue the graph instruction to the ALU. The ALU may be configured to perform a graph instruction operation. The write-back unit may be configured to write data into the status buffer, for example, configured to mark a ready field segment and a valid field segment of each graph instruction in the status buffer. Optionally, the architecture of the processor may further include a compiler, configured to compile a to-be-compiled program or code into an instruction set of the directed graph flow computing architecture. The compiler, the arbitration logic unit, and the write-back unit are not shown in FIG. 3 and FIG. 4.

In an embodiment, the architecture of the processor may further include one or more clusters (cluster), each cluster may include a plurality of PEs, and communication may be performed between a plurality of clusters and between the plurality of PEs included in each cluster by using a crossbar (crossbar) or a router (router).

FIG. 3 is described by using an example in which the architecture of the processor includes one cluster, the cluster includes four PEs, and the four PEs communicate by using one crossbar. The four PEs are respectively represented as a PE 0, a PE 1, a PE 2, and a PE 3. (a) in FIG. 4 is described by using an example in which the architecture of the processor includes two clusters and each cluster includes four PEs and one crossbar. PEs in the two clusters may implement communication between clusters and communication between a plurality of PEs in a same cluster by using two crossbars. (b) in FIG. 4 is described by using an example in which the architecture of the processor includes four clusters and each cluster includes four PEs and one crossbar. PEs in the four clusters may implement communication between clusters and communication between a plurality of PEs in a same cluster by using four crossbars.

It should be noted that, FIG. 3 is described by using an example in which a plurality of (for example, eight) graph instructions in each PE share one ALU. Certainly, a plurality of (for example, P) graph instructions in each PE may also share a plurality of (for example, X) ALUs, for example, P=8 and X=3, that is, eight graph instructions in each PE may share three ALUs. In other words, each PE may simultaneously execute three graph instructions in one clock cycle.

In addition, in FIG. 3, id represents an identifier of the graph instruction, opc represents an operation symbol of the graph instruction, op0 represents a left input operand, op1 represents a right input operand, p represents a condition input, R represents a ready field segment, V represents a valid field segment, add, mul, and cmp.ge respectively represent different operators, and dest0 and dest1 respectively represent output addresses of the graph instruction.

Specifically, in FIG. 3, the PE 0 may be configured to execute graph instructions whose IDs are 0 to 7, the PE 1 may be configured to execute graph instructions whose IDs are 8 to 15, the PE 2 may be configured to execute graph instructions whose IDs are 16 to 23, and the PE 4 may be configured to execute graph instructions whose IDs are 24 to 31. In the PE 0, output addresses of the graph instruction whose ID is 1 are 2l and 4r, that is, an operation result of the graph instruction whose ID is 1 is transferred to a left input of the graph instruction whose ID is 2 and a right input of the graph instruction whose ID is 4; an output address of the graph instruction whose ID is 2 is 3l, that is, an operation result of the graph instruction whose ID is 2 is transferred to a left input of the graph instruction whose ID is 3; an output address of the graph instruction whose ID is 3 is 4r, that is, an operation result of the graph instruction whose ID is 3 is transferred to a right input of the graph instruction whose ID is 4; and output addresses of the graph instruction whose ID is 4 are 2p and 12p, that is, an operation result of the graph instruction whose ID is 4 is transferred to a condition input of the graph instruction whose ID is 2 and a condition input of the graph instruction whose ID is 12. The graph instruction whose ID is 4 is in the PE 0, and the graph instruction whose ID is 12 is in the PE 1, that is, the two graph instructions are not in a same PE. In this case, an OU in the PE 0 may transmit the operation result of the graph instruction whose ID is 4 to an OU in the PE 1 by using the crossbar when an operation of the graph instruction whose ID is 4 ends, and the OU in the PE 1 transmits the operation result to the condition input of the graph instruction whose ID is 12.

Figure 5:
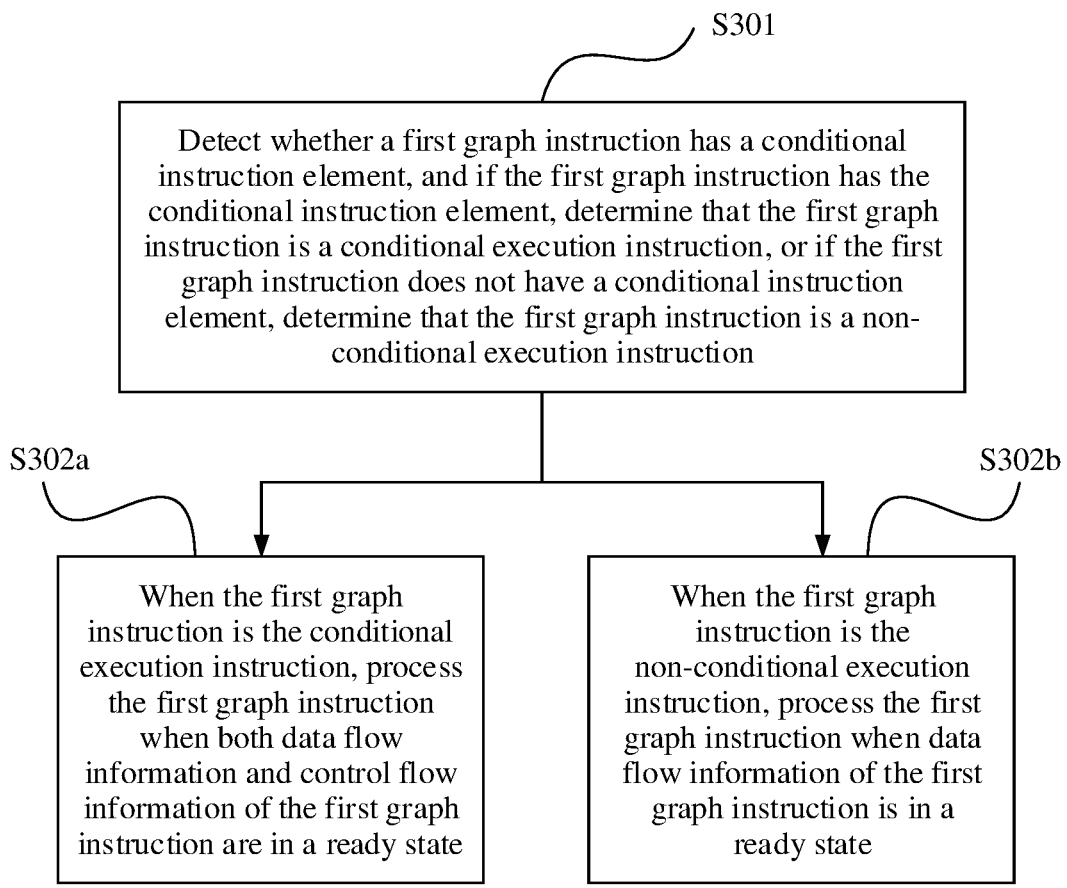
FIG. 5 is a schematic flowchart of a graph instruction processing method according to an embodiment of this application.

FIG. 5 is a schematic flowchart of a graph instruction processing method according to an embodiment of this application. The method may be applied to the processor provided above, and the method includes the following several steps.

S301: Detect whether a first graph instruction has a conditional instruction element, and if the first graph instruction has the conditional instruction element, determine that the first graph instruction is a conditional execution instruction, or if the first graph instruction does not have a conditional instruction element, determine that the first graph instruction is a non-conditional execution instruction.

The graph instruction may be a graph instruction in an instruction set in a directed graph computing architecture. The instruction set may include a plurality of graph instructions, and each graph instruction may correspond to one or more ready (ready) field segments and one or more valid (valid) field segments. A valid field segment of a graph instruction indicates whether data flow information and control flow information need to be input for the graph instruction. The data flow information may include a left input and a right input, and the control flow information may include a condition input. A ready field segment of a graph instruction indicates whether data flow information and control flow information of the graph instruction are ready, for example, indicate whether a left input and a right input in the data flow information are ready, and indicate whether a condition input in the control flow is ready. A graph instruction of an unconditionally input AND operation "a+b" is used as an example. A valid field segment of the graph instruction may indicate that data flow information required by the graph instruction includes a left input a and a right input b, and a ready field segment of the graph instruction may indicate whether a and b are ready.

In addition, the first graph instruction may be any graph instruction in the instruction set. For example, the first graph instruction may be a graph instruction in which a left input, a right input, and a condition input exist, or may be a graph instruction in which only a left input and a right input exist. Whether the first graph instruction has a conditional instruction element may also refer to whether processing of the first graph instruction needs to wait for control flow information of the first graph instruction. When the first graph instruction has the conditional instruction element, the first graph instruction is a conditional execution instruction, that is, processing of the first graph instruction needs to wait for the control flow information. When the first graph instruction does not have the conditional instruction element, the first graph instruction is a non-conditional execution instruction, that is, processing of the first graph instruction does not need to wait for the control flow information.

Optionally, the conditional instruction element may be 1 bit (bit), and a value of the 1 bit may be 0 or 1. For example, when the value of the 1 bit is 1, it indicates that the first graph instruction has the conditional instruction element, so that processing of the first graph instruction needs to wait for a condition input. When the value of the 1 bit is 0, it indicates that the first graph instruction does not have the conditional instruction element, so that processing of the first graph instruction does not need to wait for a condition input. Certainly, in actual application, when the value of the 1 bit is 0, it may also correspond to that the first graph instruction has the conditional instruction element; or when the value of the 1 bit is 1, it may correspond to that the first graph instruction does not have the conditional instruction element. This is not specifically limited in this embodiment of this application.

Specifically, whether the first graph instruction has the conditional instruction element may be configured for the first graph instruction in a compilation process. For example, in the compilation process, a compiler in the processor may configure the conditional instruction element (for example, set the value of the foregoing 1 bit to 1) or not configure the conditional indication element (for example, set the value of the foregoing 1 bit to 0) for the first graph instruction, and store configured related information, so that a PE in the processor can subsequently read the stored related information when processing the first graph instruction.

Figure 6:
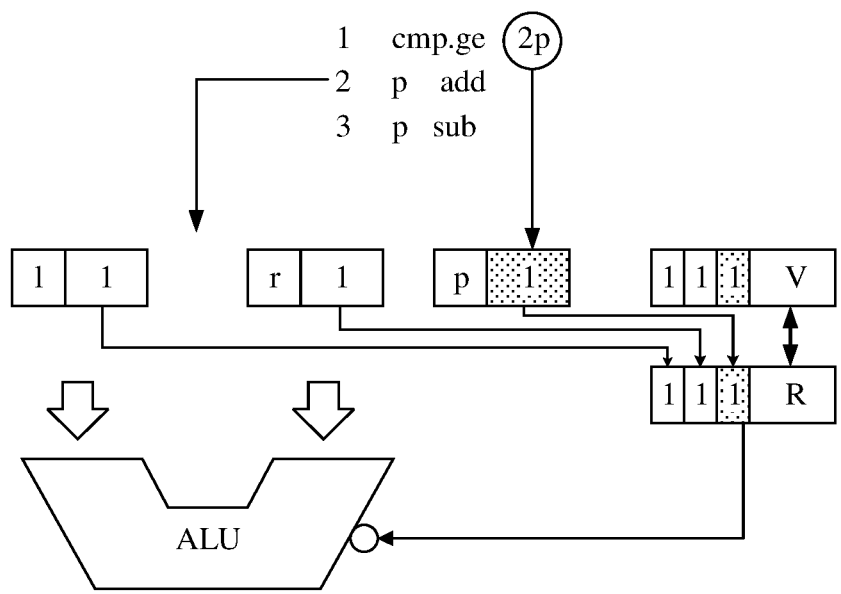
FIG. 6 is a schematic operation diagram of a graph instruction according to an embodiment of this application.

For example, as shown in FIG. 6, for an add operation of a graph instruction 2, the add operation may be compiled as "2 p add" in the compilation process; and for a sub operation of a graph instruction 3, the sub operation may be compiled as "3 p sub" in the compilation process. Herein, 2 and 3 respectively represent IDs of the graph instruction 2 and the graph instruction 3. Herein, p before add and sub represents a conditional instruction element, that is, processing of the graph instruction 2 and the graph instruction 3 needs to wait for a condition input.

S302*a*: When the first graph instruction is the conditional execution instruction, process the first graph instruction when both data flow information and control flow information of the first graph instruction are in a ready state.

That both the data flow information and the control flow information in this embodiment of this application are in a ready state may mean that both the data flow information and the control flow information are ready (which may also mean that both the data flow information and the control flow information arrive). For example, a ready field segment of the first graph instruction indicates that all a left input, a right input, and a condition input of the first graph instruction arrive, that is, both the data flow information and the control flow information of the first graph instruction are in the ready state.

Specifically, when the processor detects that the first graph instruction has the conditional instruction element, that is, the first graph instruction is the conditional execution instruction or processing of the first graph instruction needs to wait for the control flow information, the processor may detect whether the data flow information of the first graph instruction and the control flow information of the first graph instruction are ready (which may also mean whether the data flow information of the first graph instruction and the control flow information of the first graph instruction arrive), and when both the data flow information and the control flow information are ready (for example, the ready field segment of the first graph instruction indicates that all the left input, the right input, and the condition input of the first graph instruction arrive), the processor may execute the first graph instruction based on the data flow information and the control flow information.

In an embodiment, the control flow information (for example, the condition input) of the first graph instruction may be generated by another graph instruction that has a dependency relationship with the first graph instruction and that is processed before the first graph instruction. Optionally, the control flow information of the first graph instruction may include a 1-bit conditional signal. In another embodiment, the data flow information (for example, the left input and the right input) of the first graph instruction may also be generated by another graph instruction that has a dependency relationship with the first graph instruction and that is processed before the first graph instruction.

For example, as shown in FIG. 6, it is assumed that the first graph instruction is the graph instruction 2, and a valid field segment of the graph instruction 2 is 111 (indicating that a left input l, a right input r, and a condition input p need to be input for the graph instruction 2). The condition input of the graph instruction 2 is generated by a processing result of the graph instruction 1 "cmp.ge 2p (greater than or equal to), 3p (less than)". Herein, cmp.ge is a compare (compare) instruction, p following cmp.ge indicates that a conditional signal (that is, the control flow information) needs to be sent for the graph instruction, and if a processing result of cmp.ge is greater than, a 1-bit conditional signal is sent to the graph instruction 2, and if a processing result of cmp.ge is less than, a 1-bit conditional signal is sent to the graph instruction 3. When the ready field segment of the graph instruction 2 is 111, it indicates that all the left input l, the right input r, and the condition input p of the graph instruction 2 are ready, and the processor may execute the graph instruction 2. FIG. 6 is described by using an example in which all the left input l, the right input r, and the condition input p of the graph instruction 2 are 1.

S302*b*: When the first graph instruction is the nonconditional execution instruction, process the first graph instruction when data flow information of the first graph instruction is in a ready state.

Specifically, when the processor detects that the first graph instruction does not have the conditional instruction element, that is, the first graph instruction is the nonconditional execution instruction or processing of the first graph instruction does not need to wait for the control flow information, the processor may detect whether the data flow information of the first graph instruction is ready (which may also mean whether the data flow information of the first graph instruction arrives), and when the data flow information is ready (for example, the ready field segment of the first graph instruction indicates that both the left input and the right input of the first graph instruction arrive), the processor may execute the first graph instruction based on the data flow information.

Optionally, the conditional instruction element and the control flow information (for example, the condition input or the conditional signal) are transmitted through a control bus, and the data flow information (for example, the left input and the right input) is transmitted through a data bus. For example, transmission of the conditional instruction element or the conditional signal across PEs may be performed by using one crossbar, and transmission of the left input and the right input across PEs may be performed by using another crossbar. In this way, interference caused by the conditional instruction element and the control flow information to the data flow information can be reduced, and the conditional instruction element can be transmitted to any graph instruction in any PE in the processor in one clock cycle.

In this embodiment of this application, whether the first graph instruction has the conditional instruction element is detected. If the first graph instruction has the conditional instruction element, it is determined that the first graph instruction is the conditional execution instruction. If the first graph instruction does not have the conditional instruction element, it is determined that the first graph instruction is the non-conditional execution instruction. Subsequently, the first graph instruction may be correspondingly processed depending on whether the first graph instruction is the conditional execution instruction or the non-conditional execution instruction, thereby reducing requirements for a bus resource and an instruction space resource in a graph instruction processing process. For example, FIG. 6 is used as an example. p is added before each of operators of the graph instruction 2 and the graph instruction 3. It indicates that processing of the graph instruction 2 and the graph instruction 3 needs to wait for control flow information. Therefore, in a processing process of each of the graph instruction 2 and the graph instruction 3, an operation result of the graph instruction 1 needs to be waited for. If the graph instruction 2 or the graph instruction 3 does not receive a conditional signal sent by the graph instruction 1, the graph instruction 2 or the graph instruction 3 keeps waiting. In the conventional technology, regardless of whether the processing result of the graph instruction 1 is greater than or less than, the processing result needs to be sent to the graph instruction 2 and the graph instruction 3. However, in this embodiment of this application, only a conditional signal needs to be sent to another graph instruction, that is, two output addresses of the graph instruction 1 respectively correspond to true and false. If the calculation result is true, only a conditional signal needs to be sent to a first output address, and if the calculation result is false, only a conditional signal needs to be sent to a second output address, thereby greatly reducing a requirement for the bus resource.

Further, in S301*a*, the determining that the control flow information of the first graph instruction is in a ready state may include: receiving first broadcast information, where the first broadcast information indicates a first broadcast channel; and when a broadcast channel for which the first graph instruction is registered is the first broadcast channel, determining that the control flow information of the first graph instruction is in the ready state. The first broadcast information herein may be sent when a first processing result is obtained by processing a second graph instruction, and the second graph instruction may be a graph instruction with a large quantity of output addresses.

Specifically, when there are a plurality of output addresses of the second graph instruction, the processing result of the second graph instruction may be transmitted, in a broadcast manner, as a conditional signal to graph instructions corresponding to the plurality of output addresses, that is, simultaneously transmitted to a plurality of graph instructions. The plurality of graph instructions may be registered for corresponding broadcast channels in a compilation process, and corresponding broadcast information may be broadcast when the processing result is obtained by subsequently processing the second graph instruction. In addition, a plurality of graph instructions that are registered for the broadcast channel each may be allocated with a listening register. When a listening register of a graph instruction listens to a broadcast channel for which the graph instruction is registered, it may be determined that control flow information of the graph instruction is in a ready state, that is, a condition input in a ready field segment is in a ready state.

Figure 7:
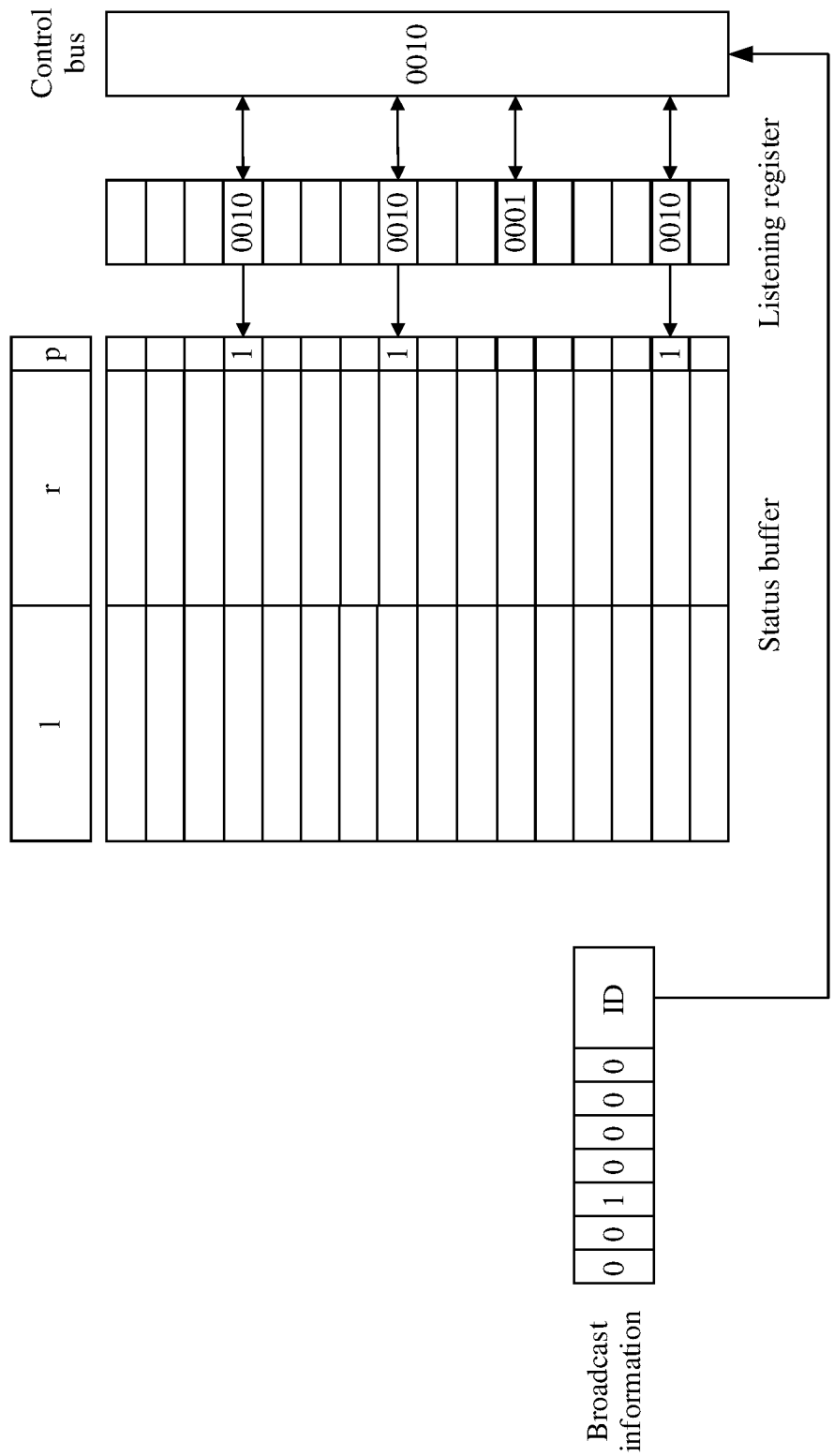
FIG. 7 is a schematic diagram of listening to broadcast information according to an embodiment of this application.

For example, as shown in FIG. 7, it is assumed that the second graph instruction is "1 cmp.ge 2p 3p 4p 5p, 6p", that is, an ID of the second graph instruction is 1, and the second graph instruction is a compare instruction (cmp.ge). If a processing result of the second graph instruction is greater than or equal to, conditional signals are sent to graph instructions whose IDs are 2, 3, 4, and 5, or if a processing result of the second graph instruction is less than, a conditional signal is sent to a graph instruction whose ID is 6. In this case, in the compilation process, the graph instructions whose IDs are 2, 3, 4, and 5 may be registered for a 0th broadcast channel b0. Subsequently, when the processing result obtained by processing the second graph instruction is greater than, broadcast information indicating the 0th broadcast channel b0 may be sent. For example, the broadcast information is a channel identifier, in this case, a listening register corresponding to the graph instructions whose IDs are 2, 3, 4, and 5 (the foregoing first graph instruction may be any graph instruction in the graph instructions whose IDs are 2, 3, 4, and 5) may listen to the broadcast channel identifier. When determining that the monitored channel identifier is consistent with a channel identifier registered by the listening register, the listening register marks condition inputs in respective ready field segments as a ready state (for example, mark a condition input p as 1). In this way, compared with the conventional technology in which a copy (copy) instruction is added according to a tree (tree) algorithm to gradually transmit the conditional signal generated by the second graph instruction, a graph instruction processing speed can be greatly improved. In the conventional technology, a specific process of gradually transmitting, by adding a copy (copy) instruction according to a tree algorithm, the conditional signal generated by the graph instruction whose ID is 1 is as follows:

1 cmp.ge 7p, 6p;
7 copy 8p 9p;
8 copy 2p 3p; and
9 copy 4p 5p.

Optionally, when the second graph instruction includes two possible processing results, and each possible processing result is correspondingly related to a plurality of graph instructions, the plurality of graph instructions related to each possible processing result may be registered for one broadcast channel, and different possible processing results are registered for different broadcast channels. For example, if the second graph instruction is "1 cmp.ge 2p 3p 4p 5p, 6p 7p 8p 9p", graph instructions whose IDs are 2, 3, 4, and 5 may be registered for the first broadcast channel, and graph instructions whose IDs are 6, 7, 8, and 9 may be registered for the second broadcast channel.

Figure 8:
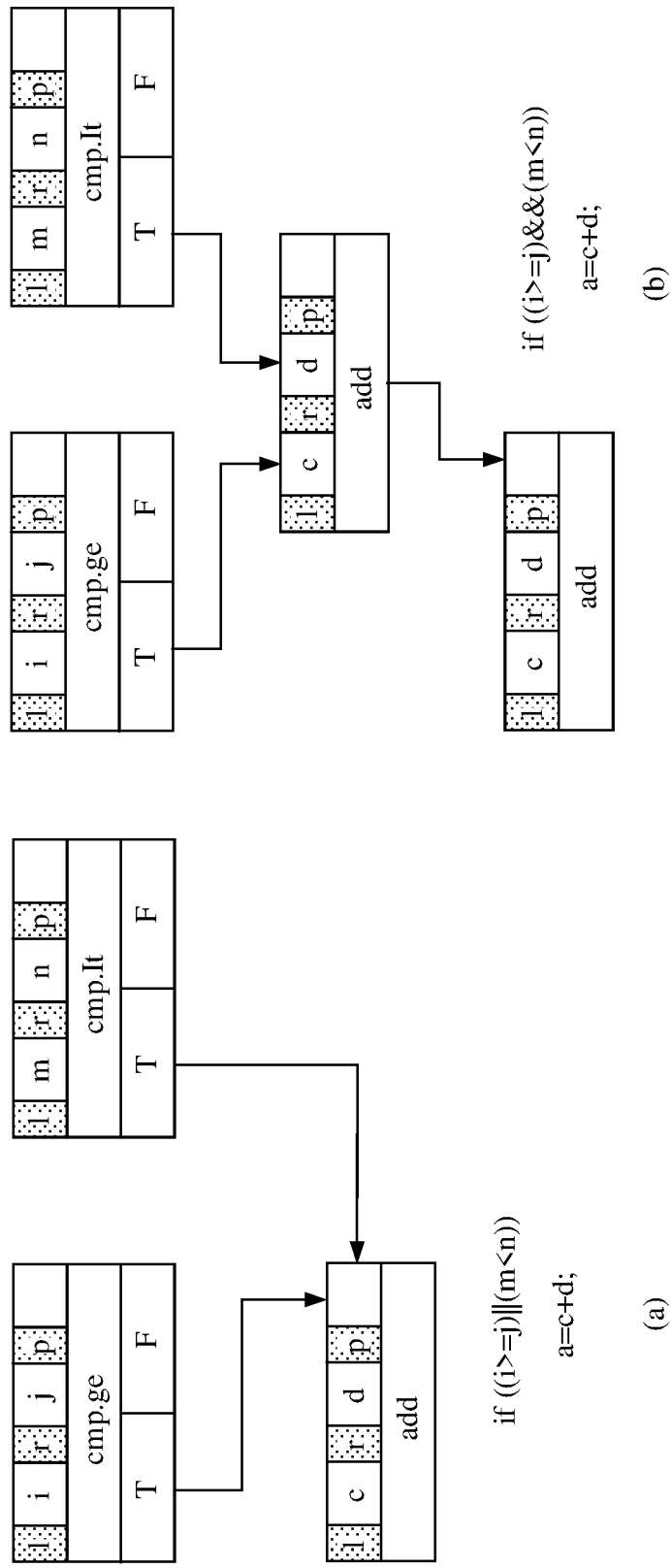
FIG. 8(a) and FIG. 8(b) are a schematic diagram of another directed graph flow computing architecture according to an embodiment of this application.

In this embodiment of this application, when the control flow information of the first graph instruction includes a logical operation, the logical operation is used to generate at least one conditional signal. For example, as shown in (a) in FIG. 8, for a graph instruction "if((i>=j)||(m<n)) a=c+d", a condition input (i>=j)||(m<n) of the graph instruction includes a logical operation, the logical operation (i>=j) may be converted into a compare instruction used to generate a first conditional signal, and the logical operation (m<n) may also be converted into a compare instruction used to generate a second conditional signal. Both the two conditional signals point to p of "c+d (that is, an add operation in the figure)", and "c+d" may be performed when at least one of the two conditional signals meets p of "c+d". For another example, as shown in (b) in FIG. 8, for a graph instruction "if((i>=j) && (m<n)) a=c+d", a condition input (i>=j) && (m<n) of the graph instruction includes a logical operation, the logical operation (i>=j) may be converted into a compare instruction used to generate a first conditional signal, and the logical operation (m<n) may also be converted into a compare instruction used to generate a second conditional signal. The two conditional signals may point to a left input and a right input of a && operation (represented as tfand2 in the figure), and the conditional signals generated by the && operation each point to p of "c+d (that is, an add operation in the figure)". In this way, "c+d" may be performed when both the first conditional signal and the second conditional signal arrive. In FIG. 8, l represents a left input, r represents a right input, p represents a condition input, T represents true (true), F represents false (false), and cmp.ge, cmp.lt, tfand2, and add represent different operators.

Further, in a directed graph flow computing architecture, in the compilation process, a direction (or an output address) of a conditional signal of a graph instruction included in a subgraph in the directed graph flow computing architecture may be adjusted, to provide flexible dispatch in two dimensions: a performance tendency and an energy efficiency tendency in a processing process of the directed graph flow computing architecture. The subgraph herein may be an instruction chain formed by a plurality of graph instructions that have a dependency relationship in the directed graph flow computing architecture.

For example, for a subgraph corresponding to "if (i<=j) A[i]=(a+b)*(c+d)", if low energy consumption needs to be ensured (in this case, performance is low), the subgraph may be executed after the if condition is executed. That is, as shown in (a) in FIG. 9, a result of comparison between i and j (that is, cmp.ge) points to an input of the subgraph. In this way, the subgraph under if is started to be executed only when a result of cmp.ge is T, and therefore four clock cycles are required to complete an entire operation. Similarly, for a subgraph corresponding to "if (i<=j) A[i]=(a+b)*(c+d)", if high performance needs to be ensured (in this case, energy consumption is high), the if condition may be executed at the end of the subgraph. That is, as shown in (b) in FIG. 9, a result of comparison between i and j (that is, cmp.ge) points to an output of the subgraph (that is, a graph instruction corresponding to st). In this way, graph instructions before the graph instruction corresponding to st may be concurrently executed independently of cmp.ge, and when a result of cmp.ge is T, the graph instruction corresponding to st can be executed in a next clock cycle, and therefore three clock cycles are required to complete an entire operation. Compared with the two manners, the first manner has lower performance but lower energy consumption, and the second manner has higher performance but if the result of cmp.ge is F, a previous operation is discarded, which causes a waste of a bus resource and an operation resource.

Figure 10:
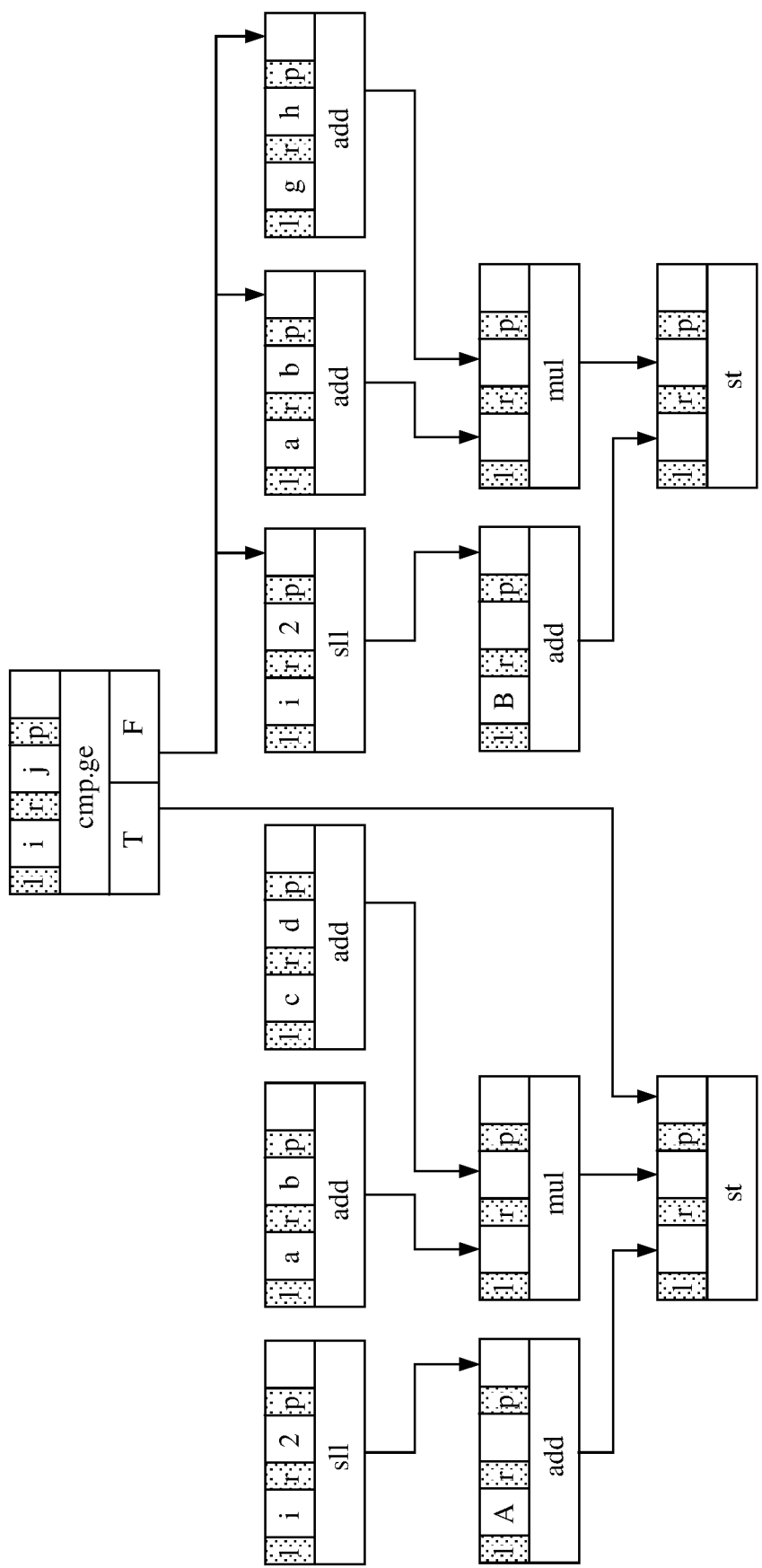
FIG. 10 is a schematic diagram of another directed graph flow computing architecture according to an embodiment of this application.

Therefore, to ensure flexible dispatch in two dimensions: the performance tendency and the energy efficiency tendency in the processing process of the directed graph flow computing architecture, the compiler may determine prediction and direction of the conditional signal of the subgraph, so that the compiler can predict a control branch by controlling a target of the conditional signal. For example, as shown in FIG. 10, for "if (i<=j) A[i]=(a+b)*(c+d); else B[i]=(e+f)*(g+h)", if the compiler finds, through analysis, that a branch of T under if is frequently executed, the compiler may point a condition branch of T after cmp.ge to an output of the subgraph under if; and if the compiler finds, through analysis, that a branch of F under if is not frequently executed, the compiler may point a condition branch of F after cmp.ge to an input of a corresponding subgraph. In this way, performance in the processing process of the directed graph flow computing architecture can be improved, and waste of the bus resource and the operation resource can be reduced.

Further, for the directed graph flow computing architecture, any graph instruction may send a conditional signal to another graph instruction, so that the compiler can manage or maintain a data read/write sequence in the directed graph flow computing architecture.

Specifically, in the directed graph flow computing architecture, a memory read/write sequence is determined based on a sequence of whether inputs of graph instructions are ready. Therefore, a memory read/write operation performed by a read instruction and a write instruction destroys a preset read/write sequence in an original program. In this embodiment of this application, the compiler may associate, by using a conditional signal, a read instruction and a write instruction that may have a dependency relationship, to forcibly reflect the memory read/write sequence in the original program. In other words, the compiler may determine, according to the preset read/write sequence, a graph instruction for issuing a conditional signal of a graph instruction.

Figure 11:
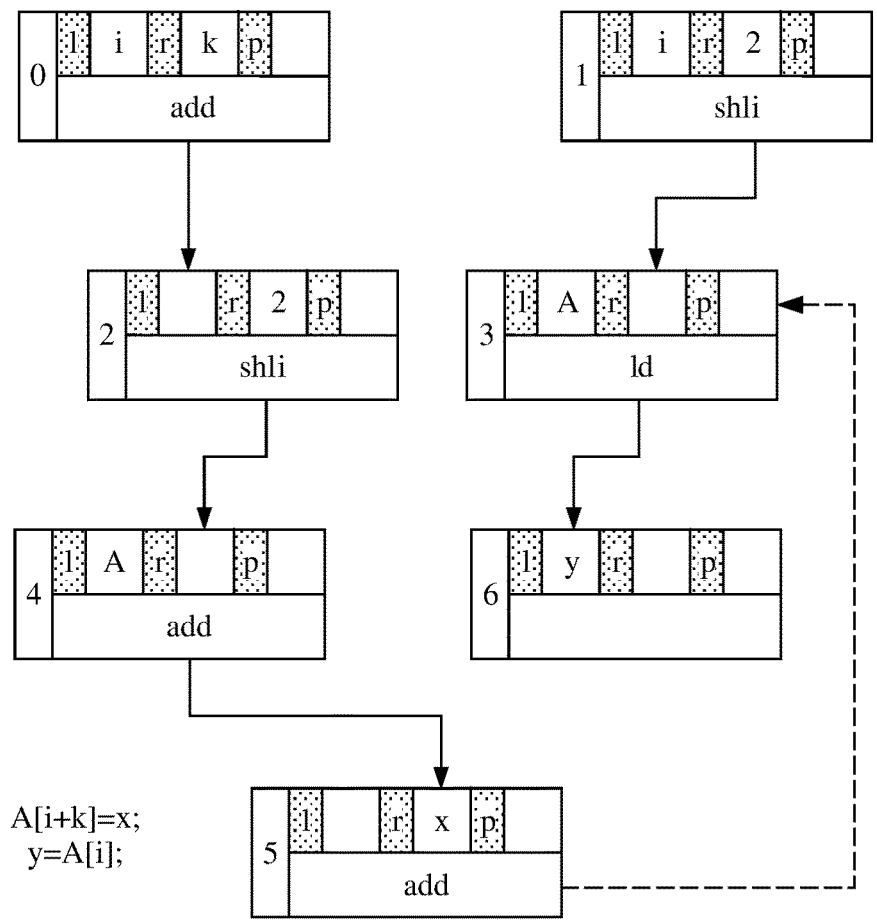
FIG. 11 is a schematic diagram of still another directed graph flow computing architecture according to an embodiment of this application.

For example, for an original program such as "A[i+k]=x y=A[i]", if a directed graph flow computing architecture corresponding to the original program is shown in FIG. 11, there is no sequence between a read instruction whose ID is 3 and a write instruction whose ID is 5. However, in the original program, only after corresponding data is written into a memory by using the write instruction whose id is 5, the data can be read by using the read instruction whose id is 3. Therefore, according to the read/write sequence in the original program, the write instruction whose id is 5 may transmit a conditional signal to the read instruction whose id is 3, that is, after the write instruction whose id is 5 is processed, a conditional signal is transmitted to p of the read instruction whose id is 3, and the read instruction whose id is 3 can read the data. In this way, it can be ensured that processing of the directed graph flow computing architecture follows the preset read/write sequence in the original program.

Figure 9:
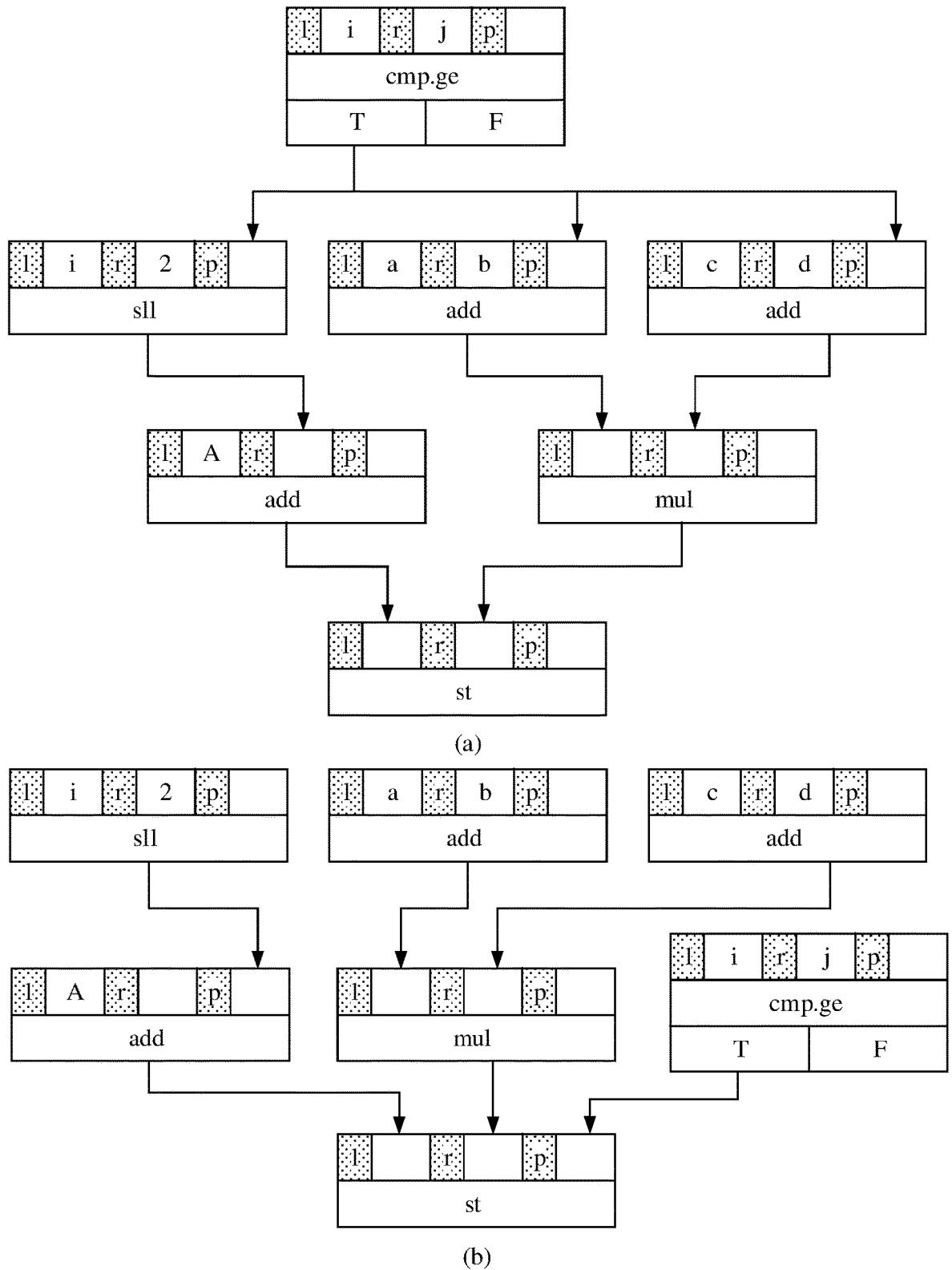
FIG. 9(a) and FIG. 9(b) are a schematic diagram of still another directed graph flow computing architecture according to an embodiment of this application.

It should be noted that, in FIG. 9 to FIG. 11, l represents a left input, r represents a right input, p represents a condition input, T represents true (true), F represents false (false), and sll, add, mul, st, shli, and ld represent different operators.

In embodiments of this application, function modules of a graph instruction processing apparatus may be divided based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 12:
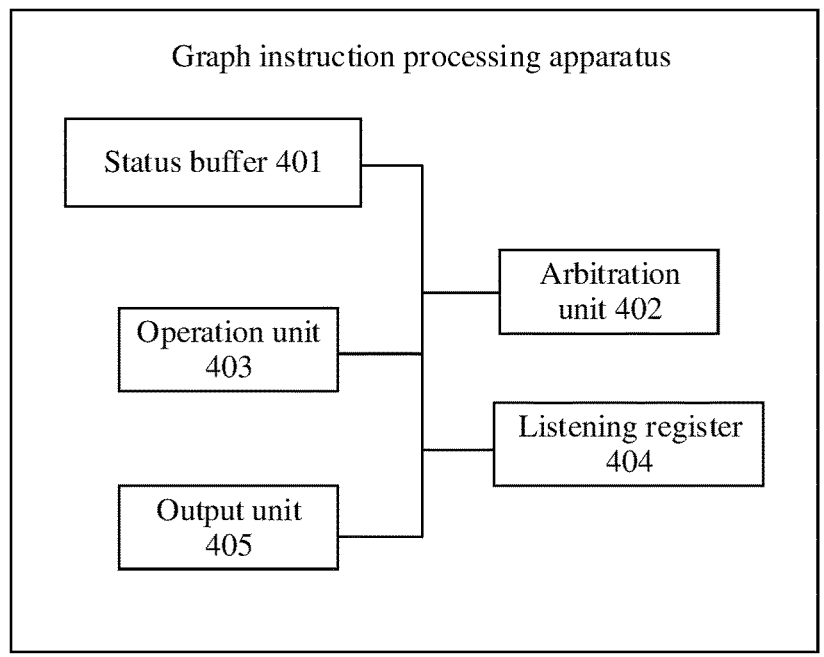
FIG. 12 is a schematic flowchart of a graph instruction processing apparatus according to an embodiment of this application.

When each function module is obtained through division based on each corresponding function, FIG. 12 is a schematic diagram of a possible structure of a graph instruction processing apparatus in the foregoing embodiments. The apparatus may be a processor or an electronic device including a processor. The apparatus includes: a status buffer unit 401, an arbitration unit 402, and an operation unit 403. Further, the apparatus may further include a listening register 404 and an output unit 405. In an actual application, the status buffer unit 401, the arbitration unit 402, the operation unit 403, the listening register 404, and the output unit 405 may be integrated together to be referred to as a processing engine PE.

The status buffer unit 401 and the arbitration unit 402 are configured to perform S301 and the step of determining that the data flow information and/or the control flow information of the first graph instruction are/is in the ready state in the foregoing method embodiment. The operation unit 403 is configured to perform the step of processing the first graph instruction in the foregoing method embodiment. The listening register 404 is configured to listen to the first broadcast information or the second broadcast information. The output unit 405 is configured to perform the step of sending the first broadcast information or the second broadcast information in the foregoing method embodiment.

The foregoing describes the graph instruction processing apparatus in embodiments of this application from a perspective of a modular function entity. The following describes a graph instruction processing apparatus in embodiments of this application from a perspective of hardware processing.

Figure 13:
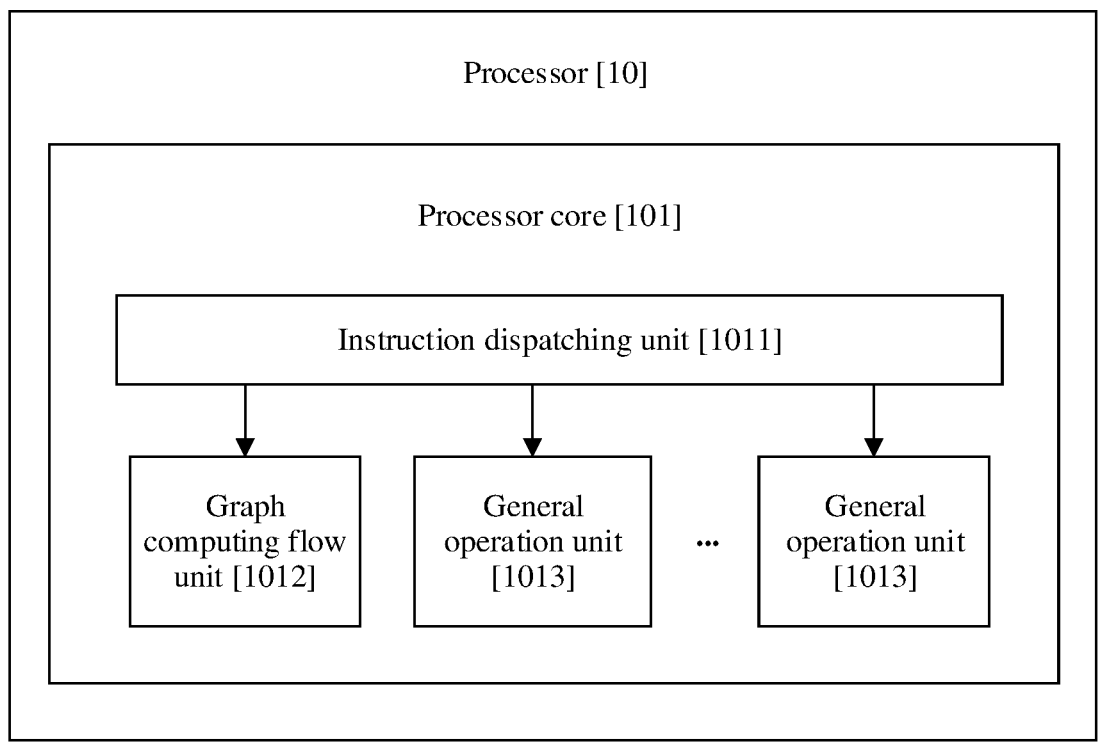
FIG. 13 is a schematic flowchart of another graph instruction processing apparatus according to an embodiment of this application.

FIG. 13 is a schematic diagram of a structure of a graph instruction processing apparatus (which may be used as a processor 10) according to an embodiment of this application. The processor 10 may be located in any electronic device, for example, various devices such as a computer, a computer, a mobile phone, a tablet, a personal digital assistant, an intelligent wearable device, a smart vehicle-mounted device, or a smart home appliance. The processor 10 may be specifically a chip, a chipset, or a circuit board on which a chip or a chip set is mounted. The chip, the chipset, or the circuit board with the chip or the chipset may work when driven by necessary software.

Specifically, the processor 10 may include at least one processor core 101, and the processor core 101 may include an instruction dispatching unit 1011, a graph computing flow unit 1012 and at least one general operation unit 1013 that are connected to the instruction dispatching unit 1011. The instruction dispatching unit 1011 runs in an issue pipeline stage of the processor core 101, to complete dispatch and distribution of a to-be-executed instruction. Both the graph computing flow unit 1012 and the at least one general operation unit 1013, as execution units (EU, which may also be referred to as functional units FUs) of the processor 10, run in an execution pipeline stage (execute stage), to complete various types of calculation tasks. Specifically, the processor 10 may directly allocate, by using the instruction dispatching unit 1011, a graph calculation task in the to-be-executed instruction to the graph computing flow unit 1012 for execution, to accelerate a function of a general-purpose processor in a graph computing mode, and dispatch a general calculation task in the to-be-executed instruction to the at least one general operation unit 1013 for execution, to implement a general computing function. Optionally, according to different calculation tasks, the processor 10 may separately invoke only the graph computing flow unit 1012 to execute the tasks, may separately invoke the at least one general operation unit 1013 to execute the tasks, or may simultaneously invoke both the graph computing flow unit 1012 and the at least one general operation unit 1013 to execute the tasks. It may be understood that the instruction dispatching unit 1011 may be connected to the graph computing flow unit 1012 and the at least one general operation unit 103 through a bus or in another manner for directly communication. A connection relationship shown in FIG. 13 does not constitute a limitation on the connection relationship between the instruction dispatching unit 1011 and the graph computing flow unit 1012 and the at least one general operation unit 103.

Figure 14:
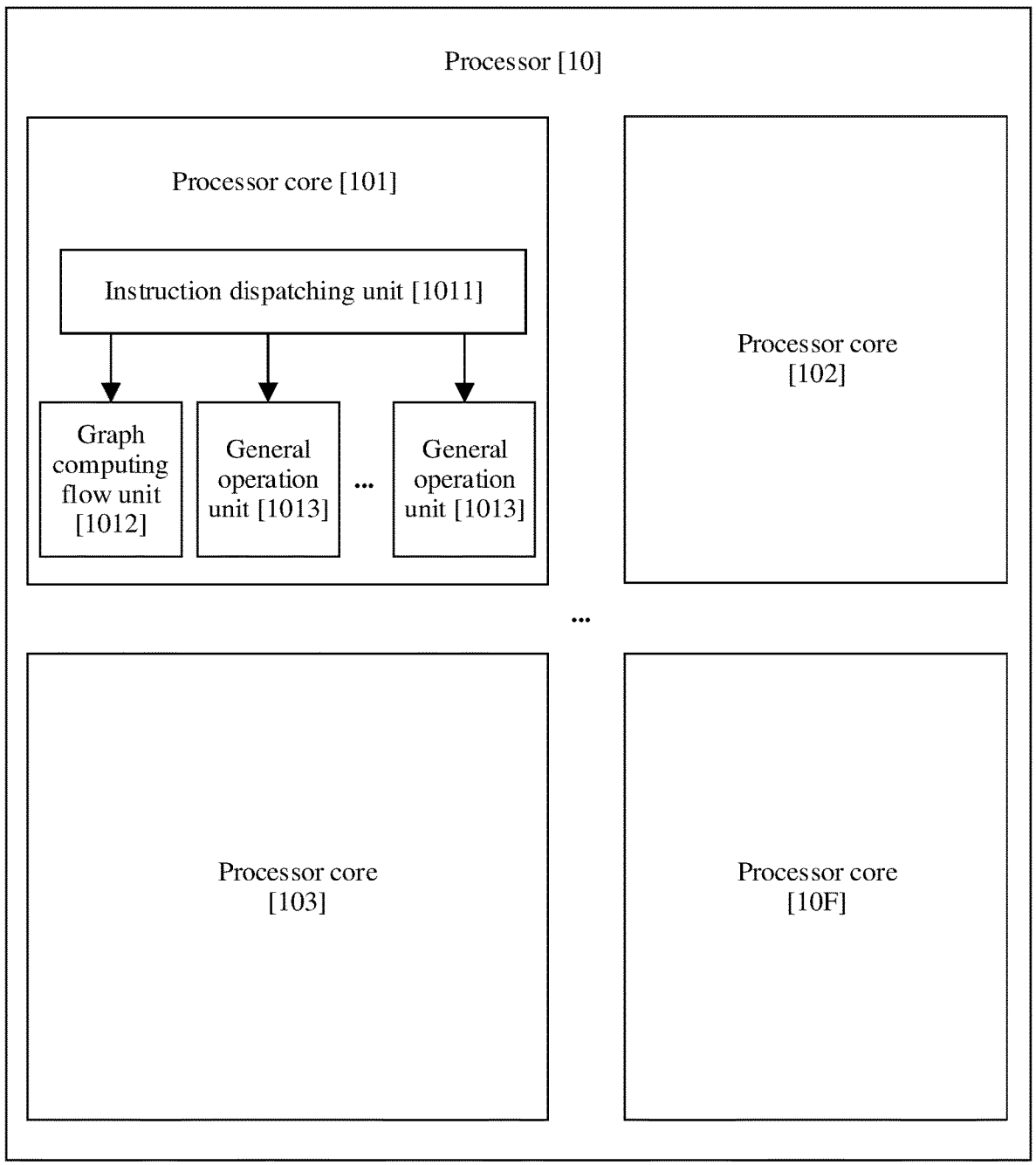
FIG. 14 is a schematic diagram of still another structure of a processor according to an embodiment of this application.

In a possible implementation, FIG. 14 is a schematic diagram of another structure of a processor according to an embodiment of this application. The processor 10 may include a plurality of processor cores (F processor cores are used as an example in FIG. 14, and F is an integer greater than 1), for example, a processor core 101, a processor core 102, a processor core 103, . . . , and a processor core 10F. The processor cores may be homogeneous or heterogeneous, that is, structures of the processor cores (102, 103, . . . , 10F) and the processor core 101 may be the same or different. This is not specifically limited in this embodiment of this application. Optionally, the processor core 101 may be used as a master processor core, the processor cores (102, 103, . . . , 10F) may be used as slave processor cores, and the master processor core and the (F−1) slave processor cores may be located in one or more chips (IC). It may be understood that the master processor core 101 and the (F−1) slave processor cores may be coupled and communicate with each other through a bus or in another manner. This is not specifically limited herein. It should be noted that a pipeline structure may vary according to a different structure of each processor core. Therefore, the pipeline structure in this application is a pipeline structure of the processor core 101, and a pipeline structure of another processor core is not specifically limited.

Figure 15:
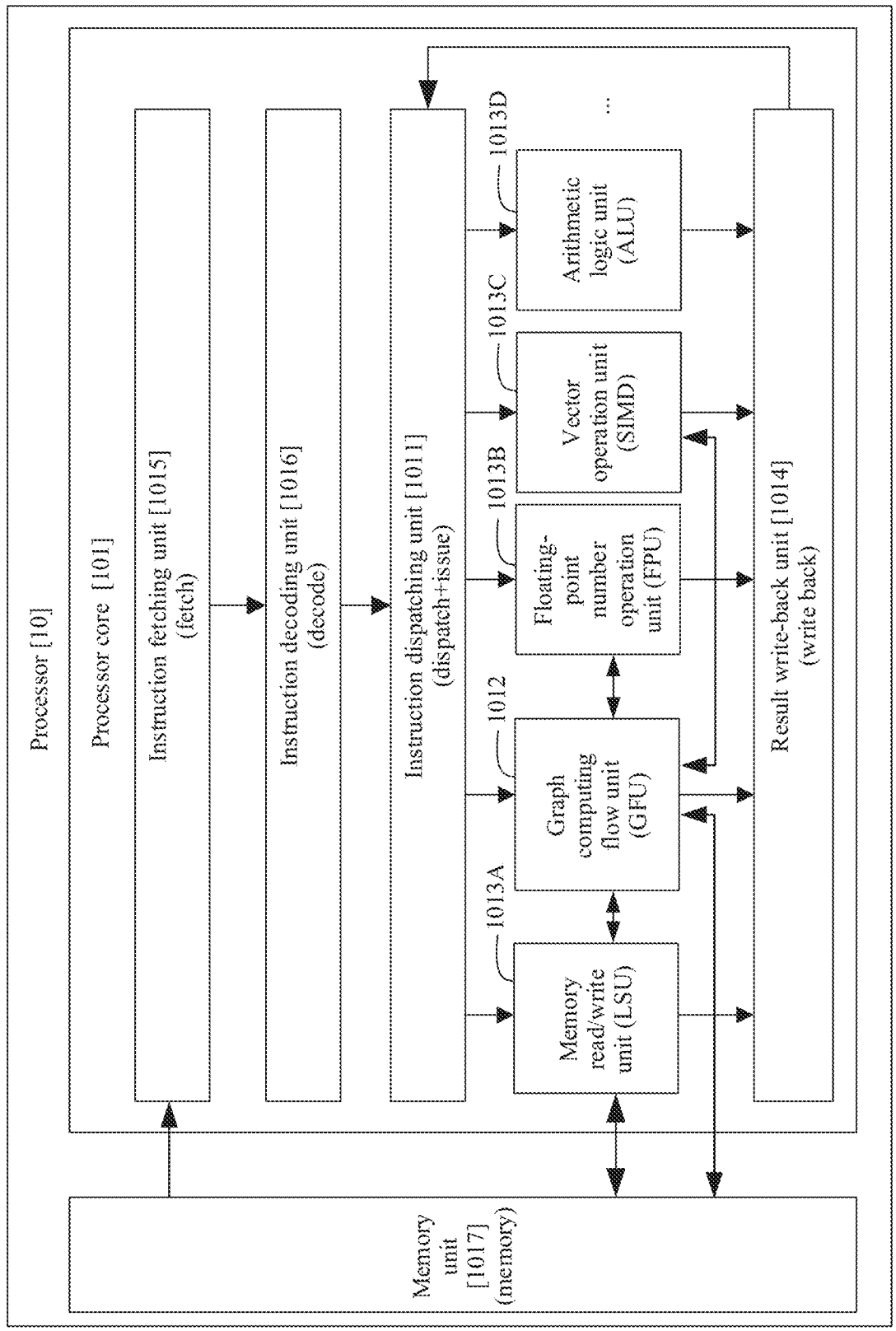
FIG. 15 is a schematic diagram of another structure of a processor according to an embodiment of this application.

In a possible implementation, FIG. 15 is a schematic diagram of still another structure of the processor 10 according to an embodiment of this application. The processor core 101 may further include an instruction fetching unit 1015 and an instruction decoding unit 1016, which respectively run in an instruction fetch pipeline stage and a bitstream decoding pipeline stage, and complete corresponding instruction fetch and instruction decoding functions. Optionally, as shown in FIG. 15, the at least one general operation unit 1013 may specifically include one or more of a memory read/write unit (load store unit, LSU) 1013A, a floating-point number operation unit (floating point unit, FPU) 1013B, a vector operation unit (single instruction multiple data, SIMD) 1013C, or an arithmetic logic unit (arithmetic and logic unit, ALU) 1013D. The plurality of general operation units (including 1013A, 1013B, 1013C, and 1013D) and the graph computing flow unit 1012 are all connected to the instruction dispatching unit 1011, and run as execution units (EU) of the processor core in an execution pipeline stage. The execution unit separately receives different types of instructions dispatched by the instruction dispatching unit 1011, and further executes, based on different hardware structures of the execution unit, an operation task of a type that the execution unit is good at. Further optionally, outside of the processor core 101 of the processor 10, a memory unit 1017 is further included. The memory read/write unit (LSU) reads/writes data from/to the memory unit 1017, which runs in a memory access pipeline stage. Further optionally, the processor core 101 further includes a result write-back unit 1014, which runs in a write-back pipeline stage and is responsible for writing a calculation result of an instruction back to a destination register. Optionally, the memory unit 1017 is usually a power outage volatile memory. When a power failure occurs, content stored in the memory unit 1017 is lost, and the memory unit 1017 may also be referred to as a memory (memory) or a main memory. The memory unit 1017 may be used as a medium for storing temporary data of an operating system or another running program in the processor 10. For example, the operating system running on the processor 10 invokes, from the memory unit 1017, data that needs to be operated to the processor core 101 for operation, and after the operation is completed, the processor core 101 transmits a result out. The memory unit 1017 may include one or more of a dynamic random access memory (DRAM), a static random access memory (SRAM), a synchronous dynamic random access memory (SDRAM), a level 1 cache (L1 cache), a level 2 cache (L2 cache), a level 3 cache (L3 cache), and the like.

Based on the foregoing architecture of the processor provided in this application, an embodiment of this application further provides a pipeline structure applicable to the foregoing architecture of the processor. A life cycle of an instruction in the pipeline structure may include an instruction fetch pipeline→a bitstream decoding pipeline→a dispatch (issue) pipeline→an execution pipeline→a memory access pipeline→a write-back pipeline. In other words, the pipeline structure divides an execution process of an instruction into at least the following six phases.

Instruction fetch pipeline: Instruction fetch (instruction fetch) refers to a process of reading an instruction from a memory.

Bitstream decoding pipeline: Instruction decoding (instruction decode) refers to a process of translating an instruction extracted from a memory.

Dispatch (issue) pipeline: Instruction dispatch and issue (instruction dispatch and issue) refers to reading a register to obtain an operand, and sending an instruction to a corresponding execution unit (EU) for execution based on a type of the instruction.

Execution pipeline: After an instruction is decoded, a type of calculation that needs to be performed is known, a required operand is read from a general register group, and then the instruction is executed (instruction execute) according to the type of the instruction to complete a calculation task. Instruction execution refers to a process of performing a real operation on an instruction. For example, if the instruction is an addition operation instruction, an addition operation is performed on the operand; if the instruction is a subtraction operation instruction, a subtraction operation is performed; or if the instruction is graph computing, a graph computing operation is performed.

Memory access pipeline: Memory access (memory access) refers to a process in which a memory access instruction reads data from a memory or writes data into a memory, and is mainly used to execute a read/write (load/store) instruction.

Write-back pipeline: Write-back (write back) refers to a process of writing an instruction execution result back to a general register group. If the instruction is a common operation instruction, a value of the result comes from a calculation result in the "execution" stage. If the instruction is a memory read instruction, the result comes from data read from the memory in the "memory access" stage.

In the foregoing pipeline structure, each instruction in the processor needs to undergo the foregoing operation steps. However, different operation steps of a plurality of instructions may be simultaneously performed. Therefore, an overall instruction flow speed can be increased, and a program execution time can be shortened. It may be understood that the foregoing processor architecture and the pipeline structure of the processor are merely some example implementations provided in embodiments of this application. The processor architecture and the pipeline structure of the processor in embodiments of this application include but are not limited to the foregoing implementations.

It should be noted that functional modules inside the processor in FIG. 15 may communicate with each other through a bus or in another connection manner, and a connection relationship shown in FIG. 15 constitutes no limitation on a connection relationship between the functional modules. Functional modules are further described in subsequent embodiments, and details are not described herein again.

It may be understood that the structures of the processor in FIG. 13 to FIG. 15 are merely some example implementations provided in embodiments of this application and the structure of the processor in embodiments of this application includes but is not limited to the foregoing implementations.

Based on the microarchitecture of the processor provided in FIG. 13 to FIG. 15 in this application, functions specifically implemented by the processor 10 may include the following:

The instruction fetching unit 1015 obtains a to-be-executed target program from the memory unit 1017. The instruction decoding unit 1016 decodes the target program according to a predetermined instruction format, to obtain a decoded to-be-executed instruction. The instruction dispatching unit 1011 receives the decoded to-be-executed instruction, where the to-be-executed instruction includes a general calculation instruction and a graph calculation control instruction, the general calculation instruction instructs to execute a general calculation task, and the graph calculation control instruction instructs to execute a graph calculation task; and sends the general calculation instruction to the at least one general operation unit, and sends the graph calculation control instruction to the graph computing flow unit. The at least one general operation unit 1013 receives and executes the general calculation instruction to obtain an execution result of the general calculation task. The graph computing flow unit 1012 receives and executes the graph calculation control instruction to obtain an execution result of the graph calculation task. The at least one general operation unit 1013 further sends a first execution result of the general calculation task to the result write-back unit 1014. The graph computing flow unit 1012 further sends a second execution result of the graph calculation task to the result write-back unit 1014. The result write-back unit 1014 stores the first execution result and the second execution result, and writes back some or all of the first execution result and the second execution result to the instruction dispatching unit 1011.

Figure 16:
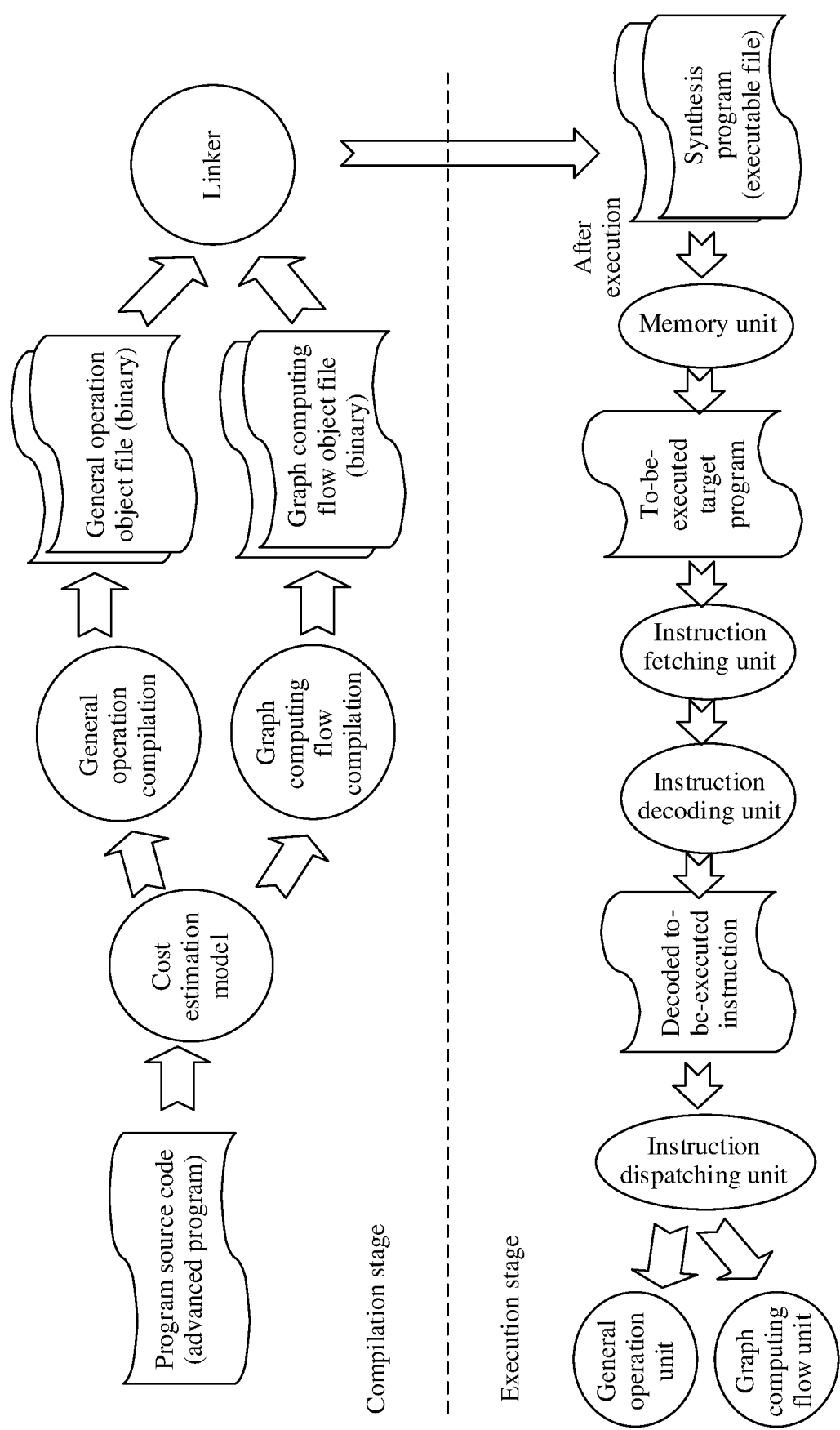
FIG. 16 is a schematic flowchart of comprehensive compilation and execution of source code according to an embodiment of this application.

First, with reference to the foregoing structures and functions of the processor 10, a process from compilation to execution of the target program in this application is described. FIG. 16 is a schematic flowchart of comprehensive compilation and execution of source code according to an embodiment of this application.

1. Program source code written in high-level languages is provided, for example, source code written by developers in various programming languages (such as C and JAVA).

2. Based on a cost estimation model, which part of code in the source program is suitable for general operation mode compilation and which part of code is suitable for graph computing flow mode compilation are determined, to compile the code into a general operation object file or a graph computing flow object file (both are binary) in different compilation modes. For example, one application (application, APP) can have millions of instructions, and there is an input-output relationship between a plurality of instructions. For example, if an input condition for executing an instruction is an output result of another instruction, basic elements (a vertex and an edge) in graph computing may be formed between the two instructions. Therefore, in the source program compilation stage, based on the cost estimation model, a complex instruction sequence (for example, an instruction sequence with a complex association relationship, indirect jump, or many interrupts) or an instruction sequence that is used only once may be compiled in a general operation mode. An instruction sequence suitable for repeated repetition, for example, a cycle or a function that is repeatedly invoked (an association relationship of the cycle or the function may be complex or simple, but usually needs to be repeatedly executed) is compiled in a graph computing flow mode. Compilation in the graph computing flow mode refers to abstracting logic used between code into a graph architecture, and generating binary machine instructions in the graph architecture in a program compilation stage (that is, compiled by a compiler in the graph computing flow mode) by using all operations that are originally performed by a processor, such as check, jump, and prediction. Because instructions in these graph architectures include a relationship between inputs and outputs of the instructions, when a GFU in the processor performs an actual operation, logic determining between the instructions can be greatly reduced, overheads in a CPU core are greatly reduced, performance is good, and power consumption is low.

3. A linker (link) is used to link a compiled general operation object file and a compiled graph computing flow object file into a synthesis program (an executable file). For example, the object file is a .o file, and when the program needs to be executed, a link is further required. In a linking process, the foregoing object file (for example, the .o file) is mainly linked to a library to create an executable file. It may be understood that compilation stages corresponding to 1, 2, and 3 may be completed on a device (such as a server or a compiler) other than a device in which the processor 10 is located, may be precompiled in advance on a device in which the processor 10 is located, or may be compiled, while executing, on a device in which the processor 10 is located. This is not specifically limited herein.

4. After the executable file is executed on the processor 10, the processor 10 loads a to-be-executed target program (for example, including a code segment, a data segment, a BSS segment, or a stack) in the executable file to the memory unit 1017 by performing a series of operations such as instruction loading, instruction prefetching, instruction pre-decoding, and branch prediction.

5. The instruction fetching unit 1015 may obtain the target program from the memory unit 1017 in a manner of continuously obtaining one instruction each time for a plurality of times, and further each instruction enters the instruction decoding unit 1016 from the instruction fetching unit 1015 for decoding.

6. The instruction decoding unit 1016 splits and interprets the to-be-executed instruction according to a predetermined instruction format, to further obtain a micro-operation instruction, that is, the decoded to-be-executed instruction in this application, and sends the micro-operation instruction to the instruction dispatching unit 1011.

7. After receiving the decoded to-be-executed instruction, the instruction dispatching unit 1011 distributes, according to a type of each instruction, the to-be-executed instruction to each execution unit (execution unit) for computing, for example, dispatches the to-be-executed instruction to the general operation unit 1013 or the graph computing flow unit 1012 for operation. Because the graph computing flow unit 1012 is disposed in the processor core 101 of the processor 10, the instruction dispatching unit 1011 may be directly connected to and communicate with the graph computing flow unit 1012, to directly dispatch an identified graph calculation control instruction to the graph computing flow unit 1012 without using another message channel or memory read/write manner for communication, thereby greatly reducing a communication delay. In a possible implementation, the general calculation instruction and the graph calculation control instruction in this application may be identified by using different flag bits (the flag bit may be added in the foregoing compilation stage), that is, different types of instructions may correspond to different instruction IDs, so that the instruction dispatching unit 1011 may perform identification based on the instruction ID.

8. The graph computing flow unit 1012 receives and executes the graph calculation control instruction, to obtain an execution result of the graph calculation task. The one or more general operation units 1013 receive and execute the general calculation instruction, to obtain an execution result of the general calculation task. Optionally, instructions may be executed in parallel or in serial between the graph computing flow unit 1012 and the general operation unit 1013, depending on a logical relationship between instructions executed by these execution units in the target program. This is not specifically limited in this embodiment of this application.

9. Finally, both the graph computing flow unit 1012 and the general operation unit 1013 may send a calculation result to the result write-back unit 1014, and the result write-back unit 1014 may feed back some or all of calculation results to the instruction dispatching unit 1011. For example, the some or all of the calculation results are used as a parameter in an instruction subsequently dispatched by the instruction dispatching unit 1011. Optionally, a first execution result or a second execution result may be directly written into the memory unit 1017, or written into the memory unit 1017 by using the memory read/write unit 1013A, so that a related execution unit (for example, the graph computing flow unit 1012 or the memory read/write unit 1013A in the figure) can obtain a required parameter from a corresponding storage location. Because the graph computing flow unit 1012 is disposed in the processor core 101 of the processor 10, the processor core 101 has permission and conditions to obtain related computing statuses (for example, the first execution result and the second execution result) of the graph computing flow unit 1012 and the another general computing unit 1013, and may further control synchronous or asynchronous running between the graph computing flow unit 1012 and the another computing unit, thereby improving running efficiency of the processor.

In conclusion, like the other general operation unit, the graph computing flow unit 1012 receives graph live in (liveIn) data on a register sent from the instruction dispatching unit 1011 (for example, including an instruction issue and reservation station), and transfers the input to a corresponding compute node of the graph computing flow unit 1012. Similarly, the graph computing flow unit 1012 also writes graph live out (liveOut) output data back to the result write-back unit 1014 (for example, including a register and a reorder buffer (reorder buffer)), to write an output of the graph to a corresponding register and an instruction reservation station that depend on the output of the graph.

The following further describes a computing model used when the graph computing flow unit used in the foregoing execution stage performs graph computing. A theoretical computing model of a graph computing flow (graphflow) in this application may be abstracted as N fully connected compute nodes (corresponding to vertices of the graph). One instruction may be placed in each node, one operation is performed, and a result is sent to itself or another node. The theoretical computing model of the graph computing flow can be divided into two stages.

1. Graph building stage (graph build): N instructions of an image building block are read from an instruction memory, and one operation instruction and a maximum of two target nodes are configured for each node in the image building block. Assuming that N is equal to 16, there are 16 compute nodes in total from 0 to 15 in 1-b. Once building is complete, an operation and a connection of each node are fixed (read-only). For example, an operation instruction in the compute node 0 is an add instruction, that is, an addition operation is performed; an operation instruction in the compute node 2 is an sll instruction, that is, a shift operation is performed; and an operation instruction in the compute node 3 is an xor instruction, that is, an exclusive OR operation is performed. For the compute node 5, an operation result of the compute node 1 and an operation result of the compute node 1 are used as an input of the compute node, to perform an ld operation (that is, an instruction fetch operation); for the compute node 6, an operation result of the compute node 2 and an operation result of the compute node 3 are used as an input of the compute node, to perform an add operation (that is, an addition operation), and so on. Operation processes of other compute nodes are not described one by one.

2. Execution stage (graph execute): An external module transmits an input (LiveIn) to start a data flow. All compute nodes run concurrently. For each node, as long as an input of each node arrives, operation can be performed and a result can be sent to a next compute node. If the input does not arrive, the node is in an idle state. The running lasts until the data flow reaches an end node (tm). Input parameters of some compute nodes (for example, compute nodes 0, 1, 2, and 3) are externally input, that is, startup data needs to be input from the external memory unit 1017. Some other compute nodes (for example, compute nodes 5, 6, 8, 9, 10, 11, 12, 13, 14, and 15) each need to internally obtain a calculation result output by a compute node connected to the compute nodes, an operation may be performed, and an operation result is input to the compute node associated with the compute nodes.

It should be noted that the processor provided in any one of FIG. 13 to FIG. 15 may be configured to perform the graph instruction processing method provided in the foregoing method embodiments. Because steps have been described in detail in the foregoing graph instruction processing method embodiments, details are not described herein again.

An embodiment of this application further provides a computer-readable storage medium. The computer-readable storage medium stores instructions, and when the instructions are run on a device (for example, the device may be a single-chip microcomputer, a chip, or a computer), the device is enabled to perform one or more steps in the foregoing method embodiments. When the modules in the foregoing graph instruction processing apparatus are implemented in a form of a software function unit and sold or used as an independent product, the modules may be stored in the computer-readable storage medium.

Based on such an understanding, an embodiment of this application further provides a computer program product including instructions. The technical solutions in this application essentially, or the part contributing to the conventional technology, or some or all of the technical solutions may be implemented in a form of a software product. The computer software product is stored in a storage medium, and includes several instructions for instructing a computer device (which may be a personal computer, a server, a network device, or the like) or a processor in the computer device to perform all or some of the steps of the methods described in embodiments of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A graph instruction processing method, wherein the method comprises:

detecting whether a first graph instruction has a conditional instruction element; and when the first graph instruction has the conditional instruction element, determining that the first graph instruction is a conditional execution instruction, and processing the first graph instruction when a ready field indicates that both data flow information and control flow information of the first graph instruction are in a ready state; or when the first graph instruction does not have a conditional instruction element, determining that the first graph instruction is a non-conditional execution instruction, and processing the first graph instruction when a ready field indicates that data flow information of the first graph instruction is in a ready state.

2. The method according to claim 1, wherein at least one of the conditional instruction element or the control flow information is 1 bit.

3. The method according to claim 1, wherein the conditional instruction element and the control flow information are transmitted through a control bus, and the data flow information is transmitted through a data bus.

4. The method according to claim 1, wherein the method further comprises:

receiving first broadcast information, wherein the first broadcast information indicates a first broadcast channel; and when a broadcast channel for which the first graph instruction is registered is the first broadcast channel, determining that the control flow information of the first graph instruction is in the ready state.

5. The method according to claim 4, wherein at least one graph instruction is registered for the first broadcast channel, the at least one graph instruction is related to a first processing result of a second graph instruction, the at least one graph instruction comprises the first graph instruction, and the method further comprises:

when a processing result of the second graph instruction is the first processing result, sending the first broadcast information.

6. The method according to claim 5, wherein the method further comprises:

when the processing result of the second graph instruction is a second processing result, sending second broadcast information, wherein the second broadcast information indicates a second broadcast channel, and a broadcast channel for which at least one graph instruction related to the second processing result is registered is the second broadcast channel.

7. The method according to claim 5, wherein the method further comprises:

registering the first graph instruction for the first broadcast channel in a process of compiling the first graph instruction.

8. The method according to claim 1, wherein when the control flow information of the first graph instruction comprises a logical operation, the logical operation is used to generate at least one conditional signal.

9. The method according to claim 1, wherein when the first graph instruction is a read instruction or a write instruction, the method further comprises:
determining, according to a preset read/write sequence, a graph instruction for issuing the control flow information of the first graph instruction.

10. A graph instruction processing device, wherein the graph instruction processing device comprises:
at least one processor;
one or more non-transitory computer-readable storage media coupled to the at least one processor and storing programming instructions for execution by the at least one processor, wherein the programming instructions, when executed, cause the device to perform operations comprising:
detecting whether a first graph instruction has a conditional instruction element; and
when the first graph instruction has the conditional instruction element, determining that the first graph instruction is a conditional execution instruction, and processing the first graph instruction when a ready field indicates that both data flow information and control flow information of the first graph instruction are in a ready state; or
when the first graph instruction does not have a conditional instruction element, determining that the first graph instruction is a non-conditional execution instruction, and processing the first graph instruction when a ready field indicates that data flow information of the first graph instruction is in a ready state.

11. The device according to claim 10, wherein at least one of the conditional instruction element or the control flow information is 1 bit.

12. The device according to claim 10, wherein the conditional instruction element and the control flow information are transmitted through a control bus, and the data flow information is transmitted through a data bus.

13. The device according to claim 10, wherein the operations further comprise:
receiving first broadcast information, wherein the first broadcast information indicates a first broadcast channel; and
when a broadcast channel for which the first graph instruction is registered is the first broadcast channel, determining that the control flow information of the first graph instruction is in the ready state.

14. The device according to claim 13, wherein at least one graph instruction is registered for the first broadcast channel, the at least one graph instruction is related to a first processing result of a second graph instruction, the at least one graph instruction comprises the first graph instruction, and the operations further comprise:
when a processing result of the second graph instruction is the first processing result, sending the first broadcast information.

15. The device according to claim 14, wherein the operations further comprise:
when the processing result of the second graph instruction is a second processing result, sending second broadcast information, wherein the second broadcast information indicates a second broadcast channel, and a broadcast channel for which at least one graph instruction related to the second processing result is registered is the second broadcast channel.

16. The device according to claim 14, wherein the operations further comprise:
registering the first graph instruction for the first broadcast channel in a process of compiling the first graph instruction.

17. The device according to claim 10, wherein when the control flow information of the first graph instruction comprises a logical operation, the logical operation is used to generate at least one conditional signal.

18. The device according to claim 10, wherein when the first graph instruction is a read instruction or a write instruction, the operations further comprise:
determining, according to a preset read/write sequence, a graph instruction for issuing the control flow information of the first graph instruction.

19. A non-transitory readable storage medium storing computer instructions, that when executed by one or more hardware processors, cause a computing device to perform operations comprising:
detecting whether a first graph instruction has a conditional instruction element; and
when the first graph instruction has the conditional instruction element, determining that the first graph instruction is a conditional execution instruction, and processing the first graph instruction when a ready field indicates that both data flow information and control flow information of the first graph instruction are in a ready state; or
when the first graph instruction does not have a conditional instruction element, determining that the first graph instruction is a non-conditional execution instruction, and processing the first graph instruction when a ready field indicates that data flow information of the first graph instruction is in a ready state.

20. The non-transitory readable storage medium according to claim 19, wherein at least one of the conditional instruction element or the control flow information is 1 bit.

* * * * *